US012127531B2

(12) United States Patent
Biffert et al.

(10) Patent No.: US 12,127,531 B2
(45) Date of Patent: Oct. 29, 2024

(54) LIVESTOCK AGE VERIFICATION SYSTEM

(71) Applicant: 701x Inc., Fargo, ND (US)

(72) Inventors: Kevin N. Biffert, Horace, ND (US); Maximillion K. Cossette, Fargo, ND (US); Steven J. Berlinger, Dilworth, MN (US); Peter S. Crowley, Fargo, ND (US); Cole L. Mehring, Fargo, ND (US); Keith D. Alsleben, Fargo, ND (US); Braydon W. Love, Fergus Falls, MN (US); Chad A. Heath, Fargo, ND (US)

(73) Assignee: 701x Inc., Fargo, ND (US)

( * ) Notice: Subject to any disclaimer, the term of this patent is extended or adjusted under 35 U.S.C. 154(b) by 178 days.

(21) Appl. No.: 18/162,869

(22) Filed: Feb. 1, 2023

(65) Prior Publication Data

US 2024/0251752 A1 Aug. 1, 2024

(51) Int. Cl.
| | |
|---|---|
| *G08B 23/00* | (2006.01) |
| *A01K 11/00* | (2006.01) |
| *A61D 99/00* | (2006.01) |
| *G01C 21/16* | (2006.01) |

(52) U.S. Cl.
CPC ............ *A01K 11/004* (2013.01); *A61D 99/00* (2013.01); *G01C 21/16* (2013.01)

(58) Field of Classification Search
CPC .... A01K 11/004; A01K 29/005; A61D 99/00; G01C 21/16
See application file for complete search history.

(56) References Cited

U.S. PATENT DOCUMENTS

| | | |
|---|---|---|
| 4,461,241 A | 7/1984 | Ostler |
| 4,503,808 A | 3/1985 | McAlister |
| 4,512,096 A | 4/1985 | Heidecker |
| (Continued) | | |

FOREIGN PATENT DOCUMENTS

| | | |
|---|---|---|
| AU | 2017239570 A1 | 4/2018 |
| CN | 101221231 A | 7/2008 |
| (Continued) | | |

OTHER PUBLICATIONS

Notice of Allowance Document Received for U.S. Appl. No. 18/162,885; Received May 8, 2024.
(Continued)

*Primary Examiner* — Toan N Pham
(74) *Attorney, Agent, or Firm* — Neustel Law Offices

(57) ABSTRACT

A system for automatically sensing, monitoring, and analyzing livestock to provide age verification and relative vigor metrics. The system generally includes a tag attachable to a livestock, a location detector, and a data processor. The tag senses livestock motion and produces first data indicative of a physical parameter. The location detector senses livestock location and produces second data indicative of the physical parameter. The data processor receives and stores a first aggregation of data of the same type as the first data and a second aggregation of data of the same type as the second data for a plurality of other livestock. The data processor statistically analyzes the first data and second data in relation to the first and second aggregations of data and generates an indication of the age and a relative vigor metric of the livestock.

20 Claims, 16 Drawing Sheets

(56) References Cited

U.S. PATENT DOCUMENTS

| | | |
|---|---|---|
| 5,711,246 A | 1/1998 | Yano |
| 5,791,294 A | 8/1998 | Manning |
| 5,857,433 A | 1/1999 | Files |
| 6,067,018 A | 5/2000 | Skelton |
| 6,111,508 A | 8/2000 | Ensor |
| 6,243,039 B1 | 6/2001 | Elliot |
| 6,375,612 B1 | 4/2002 | Guichon |
| 6,507,771 B2 | 1/2003 | Payton |
| 6,510,380 B1 | 1/2003 | Curatolo |
| 6,512,478 B1 | 1/2003 | Chien |
| 6,674,368 B2 | 1/2004 | Hawkins |
| 6,720,879 B2 | 4/2004 | Edwards |
| 6,788,199 B2 | 9/2004 | Crabtree |
| 6,868,804 B1 | 3/2005 | Huisma |
| 6,997,140 B2 | 2/2006 | Finlayson |
| 6,998,980 B2 | 2/2006 | Ingley, III |
| 6,998,985 B2 | 2/2006 | Reisman |
| 7,059,275 B2 | 6/2006 | Laitinen |
| 7,164,986 B2 | 1/2007 | Humphries |
| 7,218,229 B2 | 5/2007 | Boyd |
| 7,234,421 B2 | 6/2007 | Natividade |
| 7,248,167 B2 | 7/2007 | Wassingbo |
| 7,335,168 B2 | 2/2008 | Rugg |
| 7,411,492 B2 | 8/2008 | Greenberg |
| 7,467,603 B2 | 12/2008 | Davies |
| 7,525,425 B2 | 4/2009 | Diem |
| 7,616,124 B2 | 11/2009 | Paessel |
| 7,728,724 B1 | 6/2010 | Scalisi |
| 7,830,257 B2 | 11/2010 | Hassell |
| 7,904,244 B2 | 3/2011 | Sugla |
| 7,918,185 B2 | 4/2011 | Araki |
| 8,018,329 B2 | 9/2011 | Morgan |
| 8,125,332 B2 | 2/2012 | Curran |
| 8,149,125 B2 | 4/2012 | Geissler |
| 8,285,245 B2 | 10/2012 | Ashley, Jr. |
| 8,312,845 B2 | 11/2012 | Guinta |
| 8,340,022 B2 | 12/2012 | Lee |
| 8,849,926 B2 | 9/2014 | Marzencki |
| 8,890,677 B2 | 11/2014 | Raphaeli |
| 8,983,426 B2 | 3/2015 | Cermak |
| 9,038,293 B2 | 5/2015 | Decaluwe |
| 9,044,297 B2 | 6/2015 | Rajkondawar |
| 9,370,170 B2 * | 6/2016 | Downing .............. G01K 13/223 |
| 9,448,072 B2 | 9/2016 | Bandyopadhyay |
| 9,449,202 B2 | 9/2016 | Clare |
| 9,489,813 B1 | 11/2016 | Beigel |
| 9,504,387 B2 | 11/2016 | Lanza |
| 9,848,577 B1 * | 12/2017 | Brandao .............. A01K 11/004 |
| 9,936,676 B1 | 4/2018 | Ulmer |
| 9,980,467 B2 | 5/2018 | Auer |
| 10,075,813 B1 | 9/2018 | Struhsaker |
| 10,242,547 B1 | 3/2019 | Struhsaker |
| 10,292,370 B2 | 5/2019 | Mobley |
| 10,660,546 B2 | 5/2020 | Saigh |
| 10,697,947 B1 | 6/2020 | Armitage |
| 11,503,802 B2 | 11/2022 | Jones |
| 2002/0046713 A1 | 4/2002 | Otto |
| 2004/0074448 A1 | 4/2004 | Bunt |
| 2004/0078390 A1 | 4/2004 | Saunders |
| 2005/0162279 A1 | 7/2005 | Marshall |
| 2006/0097882 A1 | 5/2006 | Brinkerhoff |
| 2006/0161443 A1 | 7/2006 | Rollins |
| 2006/0201432 A1 | 9/2006 | Pratt |
| 2006/0267731 A1 | 11/2006 | Chen |
| 2007/0012260 A1 | 1/2007 | Boyd |
| 2007/0171048 A1 | 7/2007 | Shapiro |
| 2007/0209594 A1 | 9/2007 | Kaever |
| 2007/0229350 A1 | 10/2007 | Scalisi |
| 2008/0147458 A1 | 6/2008 | Yamazaki |
| 2010/0030036 A1 * | 2/2010 | Mottram ............ A61B 5/02055 119/858 |
| 2010/0127853 A1 | 5/2010 | Hanson |
| 2010/0156606 A1 | 6/2010 | Gold |
| 2011/0102154 A1 | 5/2011 | Hindhede |
| 2011/0125065 A1 | 5/2011 | Voronin |
| 2011/0148639 A1 | 6/2011 | Geissler |
| 2012/0050046 A1 | 3/2012 | Satorius |
| 2012/0065483 A1 | 3/2012 | Chung |
| 2013/0175347 A1 | 7/2013 | Decaluwe |
| 2013/0340305 A1 | 12/2013 | Mobley |
| 2015/0097668 A1 | 4/2015 | Toth |
| 2015/0282457 A1 | 10/2015 | Yarden |
| 2015/0373951 A1 | 12/2015 | Kelly |
| 2016/0143719 A1 | 5/2016 | Folkers |
| 2017/0156288 A1 | 6/2017 | Singh |
| 2018/0048987 A1 | 2/2018 | Morris |
| 2018/0054399 A1 | 2/2018 | Shinoda |
| 2018/0146645 A1 | 5/2018 | Arbel |
| 2018/0160649 A1 | 6/2018 | Hicks |
| 2018/0279582 A1 | 10/2018 | Yajima |
| 2018/0295809 A1 | 10/2018 | Yajima |
| 2018/0374165 A1 | 12/2018 | Ferro dos Santos |
| 2019/0008124 A1 | 1/2019 | Komatsu |
| 2019/0141959 A1 | 5/2019 | Ingham |
| 2019/0223408 A1 | 7/2019 | Brayer |
| 2019/0254601 A1 | 8/2019 | Blackmore |
| 2019/0380311 A1 | 12/2019 | Crouthamel |
| 2020/0022338 A1 | 1/2020 | Rovnyi |
| 2020/0029534 A1 | 1/2020 | Austin |
| 2020/0107522 A1 | 4/2020 | Kersey |
| 2020/0125849 A1 | 4/2020 | Labrecque |
| 2020/0159720 A1 | 5/2020 | Leong |
| 2020/0160009 A1 | 5/2020 | Vatn |
| 2020/0323170 A1 | 10/2020 | Garigan |
| 2020/0367471 A1 | 11/2020 | Deliou |
| 2021/0148881 A1 | 5/2021 | Deng |
| 2022/0104929 A1 | 4/2022 | Cummins |
| 2022/0192150 A1 | 6/2022 | Biffert |
| 2022/0192151 A1 | 6/2022 | Biffert |
| 2022/0192152 A1 | 6/2022 | Biffert |
| 2022/0200519 A1 | 6/2022 | Biffert |
| 2024/0090473 A1 * | 3/2024 | Fichman .............. A01K 11/006 |

FOREIGN PATENT DOCUMENTS

| | | |
|---|---|---|
| EP | 3188648 B1 | 1/2020 |
| FR | 2801491 A1 | 6/2001 |
| GB | 2387465 A | 10/2003 |
| WO | 2000011939 A2 | 3/2000 |
| WO | 2005034617 A1 | 4/2005 |
| WO | 2020120516 A1 | 6/2020 |
| WO | 2022005288 A1 | 1/2022 |

OTHER PUBLICATIONS

Http://www.sensehubbeef.com/; Allflex Livestock Intelligence "SenseHub Beef" Webpage; Received Sep. 3, 2020.

Http://www.sensehubbeef.com/documents/pdf/SenseHubBeef.pdf; Allflex Livestock Intelligence "SenseHub Beef" Cow Monitoring Brochure; Copyright 2018.

Https://www.cerestag.com/; Ceres Tag Website; Received Sep. 3, 2020.

Https://web.archive.org/web/20200806065228/https://www.cerestag.com/benefits/; Internet Archive Wayback Machine Archive.org "Ceres Tag Benefits" Webpage; Aug. 6, 2020.

Https://www.moovement.com.au/gps-ear-tags; mOOvement "GPS Ear Tag" Website; Received Sep. 3, 2020.

Https://ieeexplore.ieee.org/document/1280774; IEEE Xplore Webpage Article "Wearable Sensor System for Wireless State-of-Health Determination in Cattle"; L. Nagl; Sep. 17, 2003.

Https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.

Https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.

Http://www.diva-portal.org/smash/get/diva2:21508/FULLTEXT01.pdf; Diva Article "Sensor Systems for Positioning and Identification in Ubiquitous Computing"; Suri Jayabharath Kumar; Feb. 13, 2006.

(56) References Cited

OTHER PUBLICATIONS

Https:/www.beefcentral.com/ag-tech/gps-enabled-livestock-monitoring-tags-reach-the-commercial-market/; GPS-enabled livestock monitoring tags reach the commercial market; Beef Central; Mar. 17, 2020.
Https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.
PCT International Search Report and Opinion for PCT/US2021/064611; Apr. 27, 2022.
PCT International Search Report and Written Opinion for PCT/US2023/086378; Apr. 11, 2024.
Atmel 8-Bit AVR Microcontroller with 2/4/8K Byes In-System Programmable Flash Datasheet; 2013. (Year: 2013).
Non-Final Office Action Document Received for U.S. Appl. No. 17/557,559; Received Dec. 22, 2023.
PCT International Search Report and Written Opinion for PCT/US2023/086390; Apr. 19, 2024.
Https://www.gammon.com.au/power; "Power Saving Techniques for Microprocessors" Gammon Forum Webpage; Jan. 13, 2012.

\* cited by examiner

| TAG ID | TAG ENCRYPTION KEY(S) | ASSET NUMBER | | | | | | |
|---|---|---|---|---|---|---|---|---|
| TAG DATA | | | | | | | | |
| DATE/ TIME | TAG ORIENTATION | TAG ELEVATION | TAG MOTION | TAG POS. | ACTIVITY/ BEHAVIOR | BIOMETRIC DATA | ENVIRONMENT DATA | LOCAL SENSOR DATA |
| ... | ... | ... | ... | ... | ... | ... | ... | ... |
| ... | ... | ... | ... | ... | ... | ... | ... | ... |

FIG. 6

| TAG ID | DATE/TIME | TAG DATA | OTHER SENSOR DATA | TAG LOCATION DATA | DETERMINED ACTIVITY/ BEHAVIOR |
|---|---|---|---|---|---|
| ... | ... | ... | ... | ... | ... |

176 ↗ (table 174)

| TAG ID/ ASSET NO. | BREED | SEX | BIRTH DATE |
|---|---|---|---|
| ... | ... | ... | ... |

178 (table)

FIG. 10A

| DATA SOURCE | BREED | SEX | AGE | TAG ID | DATE/TIME | TAG DATA |
|---|---|---|---|---|---|---|
| TAG | ANGUS | M | 1 | | | |
| | ⋮ | ⋮ | ⋮ | | | |
| | | | 2 | | | |
| | ⋮ | ⋮ | ⋮ | | | |
| | ⋮ | F | 1 | | | |
| | ⋮ | ⋮ | ⋮ | | | |
| | ⋮ | ⋮ | 2 | | | |
| | ⋮ | ⋮ | ⋮ | | | |
| | HEREFORD | M | 1 | | | |
| | ⋮ | ⋮ | ⋮ | | | |
| | ⋮ | ⋮ | 2 | | | |
| | ⋮ | ⋮ | ⋮ | | | |
| | ⋮ | F | 1 | | | |
| | ⋮ | ⋮ | ⋮ | | | |
| | ⋮ | ⋮ | 2 | | | |
| | ⋮ | ⋮ | ⋮ | | | |
| | SIMMENTAL | M | 1 | | | |
| | ⋮ | ⋮ | ⋮ | | | |
| | ⋮ | ⋮ | ⋮ | | | |

FIG. 10B

| DATA SOURCE | BREED | SEX | AGE | TAG ID | DATE/TIME | LDS DATA |
|---|---|---|---|---|---|---|
| LDS | ANGUS | M | 1 | | | |
| | ⋮ | ⋮ | ⋮ | | | |
| | | | 2 | | | |
| | ⋮ | ⋮ | ⋮ | | | |
| | | F | 1 | | | |
| | ⋮ | ⋮ | ⋮ | | | |
| | | | 2 | | | |
| | ⋮ | ⋮ | ⋮ | | | |
| | HEREFORD | M | 1 | | | |
| | ⋮ | ⋮ | ⋮ | | | |
| | | | 2 | | | |
| | ⋮ | ⋮ | ⋮ | | | |
| | | F | 1 | | | |
| | ⋮ | ⋮ | ⋮ | | | |
| | | | 2 | | | |
| | ⋮ | ⋮ | ⋮ | | | |
| | SIMMENTAL | M | 1 | | | |
| | ⋮ | ⋮ | ⋮ | | | |
| | ⋮ | ⋮ | ⋮ | | | |

FIG. 10C

LIVESTOCK AGE VERIFICATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to a system for sensing, monitoring, and analyzing characteristics of livestock to provide age verification and relative vigor metrics.

Tags fitted with sensors and electronics have been attached externally to various body parts of cattle and other livestock as components of livestock management systems to sense, record, and communicate data regarding the location, certain physical parameters, and the health and welfare of the livestock. For example, such tags have been attached to the ears, dewlap, tail, and brisket regions of cattle.

Livestock producers and buyers rely on metrics including the weight of livestock at birth and at various subsequent ages to evaluate the merits and value of individual livestock and their progeny for breeding and other purposes. Various breed associations publish Expected Progeny Difference (EPD) scores for livestock registered with them. EPD scores are based on weight at birth and at various ages, as well as other physical characteristics. Livestock producers and buyers can use such EPD scores to rate the relative merits and value of potential breeding livestock and their progeny in comparison to other livestock of the same breed.

However, EPD scores are only as accurate and thus as useful as the accuracy of the underlying data from which they are determined. For example, if the actual birth date of a livestock is earlier than the date provided to a breed association, and/or if the actual birth weight is less than the birth weight provided, then the resulting EPD scores for the livestock may be inaccurately inflated so that the livestock will appear to be more valuable for breeding than it really is. Thus, there is a need for a way to verify that the birth dates and birth weights of livestock registered with breed associations are accurate.

In addition, there is a need for a more accurate way for livestock producers and buyers of livestock to determine if a livestock will be suitable for inclusion in their herds and will thrive in the environment of their particular area under management. Thus, there is a need for a way to provide a relative vigor metric of livestock.

The various embodiments of the present disclosure address these needs and provide other benefits as described further herein below. Any discussion of the related art throughout 18 the specification should in no way be considered as an admission that such related art is widely known or forms part of common general knowledge in the field.

SUMMARY

Some of the various example embodiments of the present disclosure relate to a livestock age verification system 10 that can automatically predict a birth date and age of a livestock 12, verify the accuracy of a stated age for the livestock 12, and generate vigor and relative vigor metrics for the livestock 12.

One example embodiment of the livestock age verification system 10 of the present disclosure includes a tag 20 attachable to a livestock 12 and a data processor 120. The tag comprises a sensor that is adapted to sense a physical parameter of the livestock 12 and wirelessly communicate a first data indicative of the physical parameter. The data processor 120 is adapted to receive the first data and comprises a data storage for storing a first aggregation of data of the same type as the first data for a plurality of other livestock. The data processor 120 is configured to perform an analysis of the first data alone and/or in relation to the first aggregation of data, and generate an indication of the age of the livestock 12 from the analysis.

Another example embodiment of the livestock age verification system 10 of the present disclosure includes a tag 20 attachable to a livestock 12, a location detection system (LDS) 100, and a data processor 120. The LDS 100 is configured to wirelessly communicate with the tag 20 to produce location-related data for the livestock 12, generate from the location-related data a first data indicative of movement and/or a type of movement of the livestock 12, and wirelessly communicate the first data to the data processor 120. The data processor 120 comprises a data storage for storing a first aggregation of data of the same type as the first data for a plurality of other livestock. The data processor 120 is configured to receive the first data, perform an analysis of the first data alone and/or in relation to the first aggregation of data, and generate an indication of the age of the livestock from the analysis that can be compared to a stated age to verify the stated age.

Another example embodiment of the livestock age verification system 10 of the present disclosure includes a tag 20 attachable to a livestock 12, an LDS 100, and a data processor 120. The tag 20 comprises a sensor that is adapted to sense a physical parameter of the livestock 12 and wirelessly communicate a first data indicative of the physical parameter. The LDS 100 is configured to wirelessly communicate with the tag to produce a location-related data of the livestock 12, generate from the location-related data a second data indicative of the physical parameter of the livestock, and wirelessly communicate the second data indicative of the physical parameter. The physical parameter can be motion-related, location-related, biometric or a combination thereof. The data processor 120 is adapted to receive the first data and the second data, and comprises a data storage for storing a first aggregation of data of the same type as the first data for a plurality of other livestock and a second aggregation of data of the same type as the second data for a plurality of the other livestock. The data processor 120 is configured to perform an analysis of the first data in relation to the first aggregation of data, an analysis of the second data in relation the second aggregation of data, and to generate an indication of the age of the livestock 12 from the analyses.

In some example embodiments, the sensor included in the tag 20 can be an IMU 36 and the physical parameter sensed by the sensor can be motion-related, and may comprise, among other things, stationary, resting, ambulating, walking, running, eating/drinking, grazing, etc.

In some example embodiments one or more biometric sensors 30 attached to the livestock 12 can be included and the physical parameter sensed by the sensors 30 can comprise, among other things, heart rate, blood oxygenation, and/or internal temperature.

In some example embodiments the location-related data generated by the LDS 100 can comprise, among other things, no change in location, change in location, rate of change, etc., as well as movement or type of movement data including stationary, ambulating, walking, running, grazing, etc.

In some example embodiments, the analysis of the first data alone and/or in relation to the first aggregation of data, the analysis of the second data alone and/or in relation to the second aggregation of data, or both, to generate an indication of the age of the livestock 12 can comprise a statistical analysis. In the various example embodiments, the age generated by the livestock age verification system 10 can be compared to a stated age of the livestock 12 to verify the stated age.

In some example embodiments, the data processor 120 is configured to generate an indication of the relative vigor of the livestock 12 from the analysis of the first data in relation to the first aggregation of data, the second data in relation to the second aggregation of data, or both.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

FIG. 6 is a block diagram illustrating a logical data structure for a tag of a livestock age verification system in accordance with an example embodiment.

FIG. 10A is a block diagram illustrating a logical data structure for a data processor of a livestock age verification system in accordance with an example embodiment.

FIG. 10B is a block diagram illustrating an arrangement of aggregated and categorized data of a data processor of a livestock age verification system in accordance with an example embodiment.

FIG. 10C is a block diagram illustrating another arrangement of aggregated and categorized data of a data processor of a livestock age verification system in accordance with an example embodiment.

DETAILED DESCRIPTION

A. Incorporation by Reference

Figure 1A:
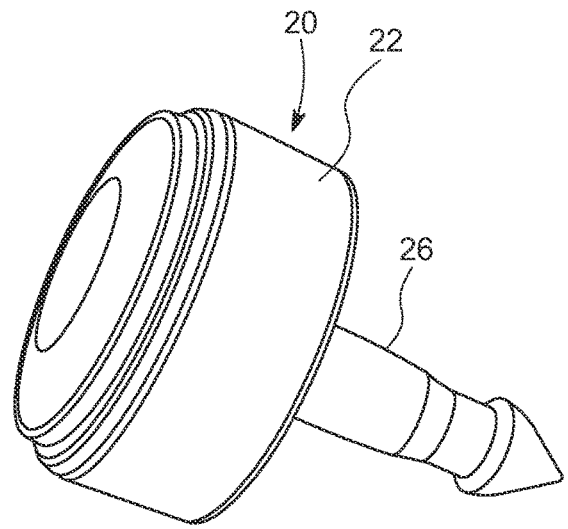
FIG. 1A is a perspective view of a tag of a livestock age verification system in accordance with an example embodiment.
Figure 1B:
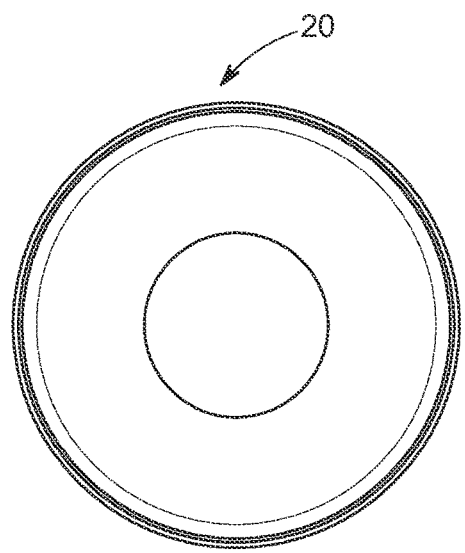
FIG. 1B is a front view of a tag of a livestock age verification system in accordance with an example embodiment.
Figure 1C:
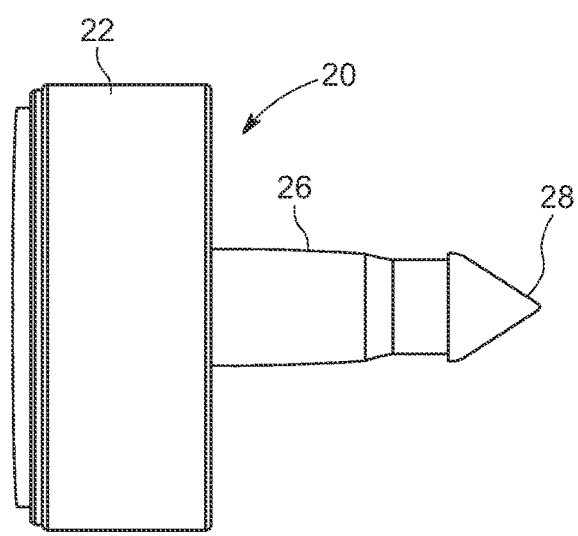
FIG. 1C is a side view of a tag of a livestock age verification system in accordance with an example embodiment.

The entire disclosures of Published U.S. Patent Appl. Nos. US-2022-0192150-A1, US-2022-0200519-A1, and US-2022-0192151-A1, each published on Jun. 23, 2022, except for any definitions, disclaimers, disavowals, and inconsistencies, are incorporated herein by reference.

B. Overview

The various example embodiments of the present disclosure relate to a livestock age verification system 10 that can automatically and autonomously predict or determine a birthdate and age of a livestock 12, verify the accuracy of a stated age for the livestock 12, and generate vigor and relative vigor metrics for the livestock 12. The various example embodiments include a tag 20 that is attachable to a livestock 12, a plurality of other tags attached to a plurality of other livestock, and a data processor 120. Some example embodiments include a radiolocation detection system (LDS) 100.

The tag 20 is attached to the livestock 12 and comprises a sensor that senses components of motion of the livestock 12 that are indicative of a physical parameter of the livestock 12. The sensor can comprise for example an IMU 36. One or more sensors 30 also attached to the livestock 12 can sense biometric data of the livestock 12 that are indicative of the physical parameter and communicate the data to the tag 20. In turn, the tag 20 wirelessly communicates the data to the data processor 120. The physical parameter is one that can be used to determine or predict the birth date and age of the livestock 12, and a relative vigor metric for the livestock 12. Physical parameters can include activity and behavior parameters such as stationary, resting, ambulating, walking, running, eating/drinking, grazing, jumping mounting, standing to be mounted, etc., and biometric parameters, such as heart rate, blood oxygenation, internal temperature, etc. The data communicated to the data processor 120 can include the data from the IMU 36 and biometric sensors 30 as well as determinations of the physical parameters determined by the tag 20 from the data.

The data processor 120 is adapted and configured to receive the data and determinations from the tag 20 and aggregate it with the same type of data and determinations from a plurality of other tags attached to a plurality of other livestock. The data processor 120 is also configured to categorize the aggregated data according to one or more shared physical characteristics of the livestock, e.g., breed, sex, and age. The data processor 120 includes a data storage 130 for storing the data and determinations from the tag 20 and the aggregated and categorized data and determinations from the plurality of other tags attached to the plurality of other livestock. The data processor 120 is configured to perform an analysis of the data and determinations from the tag 20 alone and/or in relation to the same types of data and determinations in the aggregated and categorized data, and to predict or determine the birth date and age of the livestock 12 from the analysis. The predicted or determined age is compared to a stated age to verify the accuracy of the stated age. The data processor 120 is also configured to perform an analysis of the data and determinations from the tag 20 in relation to the same types of data and determinations in the aggregated and categorized data to generate a vigor metric or score of the livestock 12 and a relative vigor metric for the livestock 12 in relation to other livestock sharing the same physical characteristics.

The LDS 100, if included, is configured to wirelessly communicate with the tag 20 to determine the location of the tag 20 and the livestock 12 using radiolocation techniques. The LDS 100 also determines changes in location, distance between locations, and rate of change between locations which indicate the movement and type of movement of the tag 20 and livestock 12, e.g., stationary, walking, running, grazing, etc. The LDS 100 wirelessly communicates the location and movement-related data to the data processor 120. The data processor 120 comprises a data storage for storing an aggregation of data of the same type as communicated by the LDS 100 data for a plurality of other livestock. The data processor is configured to receive the data, perform an analysis on the data alone and/or in relation to the aggregation of same-type data, and predict or determine the birth date and age of the livestock from the analysis. The predicted or determined age is compared to a stated age to verify the accuracy of the stated age. The data processor 120 is also configured to perform an analysis of the data and determinations from the LDS 100 in relation to the same types of data and determinations in the aggregated and categorized data to generate a vigor metric or score of the livestock 12 and a relative vigor metric for the livestock 12 in relation to other livestock sharing the same physical characteristics.

In one example embodiment of the livestock age verification system 10, the tag 20 and the LDS 100 both generate and wirelessly communicate their respective motion-related and location-related data and related determinations for a livestock 12 to the data processor 120. The data processor 120 is adapted and configured to aggregate the tag 20 data for the livestock 12 with the same type of data and determinations from a plurality of other tags attached to a plurality of other livestock, and to aggregate the LDS 100 data for the livestock with the same type of data and determinations from the LDS 100 for a plurality of other tags attached to a plurality of other livestock. The data processor 120 is also configured to categorize the first aggregation of tag 20 data and the second aggregation of LDS 100 data according to one or more shared physical characteristics of the livestock, e.g., breed, sex, and age. The data processor 120 is configured to perform an analysis of the tag 20 data for the livestock 12 in relation to the first aggregation of data, an analysis of the LDS 100 data for the livestock 12 in relation to the second aggregation of data, and to predictor determine the birth date and age of the livestock 12 from the analyses. The data processor 120 is also configured to perform an analysis of the data and determinations from the tag 20 and the LDS 100 in relation to the same types of data and determinations in the first and second aggregations of data to generate a vigor metric for the livestock 12 and a relative vigor metric for the livestock 12 in relation to other livestock sharing the same physical characteristics.

C. Exemplary Telecommunications Networks

Some of the example embodiments of the present disclosure may be utilized upon any telecommunications network capable of transmitting data including voice data and other types of electronic data. Examples of suitable telecommunications networks for some of the embodiments of the present disclosure include but are not limited to global computer networks (e.g., Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). Some of the example embodiments of the present disclosure may communicate via a single telecommunications network or multiple telecommunications networks concurrently. Various protocols may be utilized by the electronic devices for communications such as but not limited to HTTP, SMTP, FTP and WAP (wireless Application Protocol). Some of the embodiments of the present disclosure may be implemented upon various wireless networks such as but not limited to 3G, 4G, 5G, LTE, CDPD, CDMA, GSM, PDC, PHS, TDMA, FLEX, REFLEX, IDEN, TETRA, DECT, DATATAC, and MOBITEX. Some of the various example embodiments of the present disclosure may also be utilized with online services and internet service providers.

The Internet is an exemplary telecommunications network for the embodiments of the present disclosure. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

D. Central Communication Unit

Some of the example embodiments of the present disclosure may be utilized upon a telecommunications network comprising a central communication unit. The central communication unit may be comprised of any central communication site where communications are preferably established with. The central communication units may be comprised of a server computer, cloud based computer, virtual computer, home computer or other computer system capable of receiving and transmitting data via IP networks and the telecommunication networks. As can be appreciated, a modem or other communication device may be required between each of the central communication units and the corresponding telecommunication networks. The central communication unit may be comprised of any electronic system capable of receiving and transmitting information (e.g., voice data, computer data, etc.).

E. Mobile Device

Some of the example embodiments of the present disclosure may be utilized upon a telecommunications network comprising one or more mobile devices. A mobile device may be comprised of any type of computer for practicing the various aspects of the embodiments of the present disclosure. For example, the mobile device can be a personal computer (e.g., APPLE® based computer, an IBM based computer, or compatible thereof) or tablet computer (e.g. IPAD®). The mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

A mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system.

Other types of user input devices can also be used in conjunction with the embodiments of the present disclosure. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

F. Tag(s) and Sensor(s)

Example embodiments of a livestock age verification system 10 include at least one tag 20 and may include a plurality of tags 20. Each tag 20 is adapted to be attached to an individual livestock 12. The individual livestock 12 can be an individual animal or can be one of a managed plurality or herd of livestock 12. The embodiments of the present disclosure are directed primarily to use with livestock 12 that are bovine, e.g., cattle, including calves, but can also be used with other types of livestock.

Figure 2:
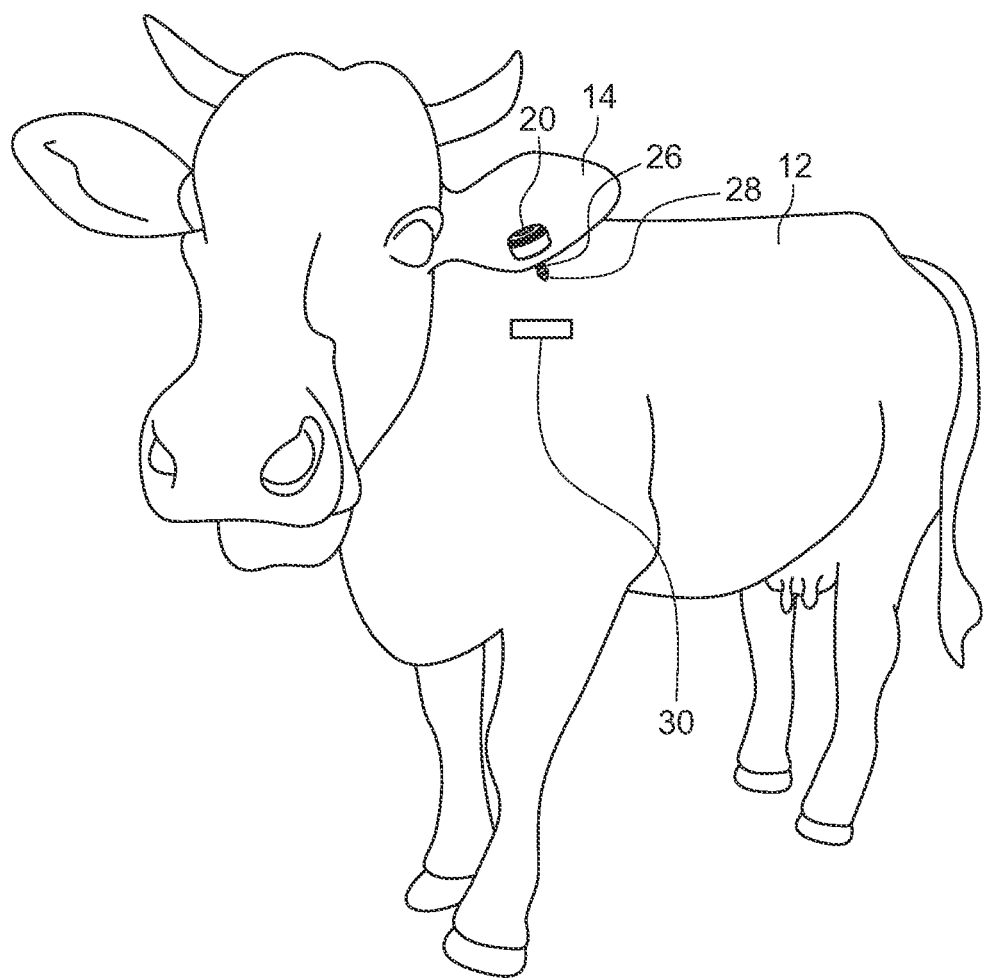
FIG. 2 is a perspective view of a graphical representation of a livestock with a tag of a livestock age verification system attached in accordance with an example embodiment.

The tag 20 is preferably adapted to be physically attached to an external body part of an individual livestock 12, preferably in a location where the tag 20 will be both readily visible and readily physically accessible. For example, as illustrated in FIG. 2 the tag 20 may be attached to the outer ear or auricle 14 of a livestock 12 in a location and manner familiar to those skilled in the art. Alternatively, the tag 20 can be attached to another suitable location. The tag 20 is mobile with the animal to which it is attached and is preferably relatively small, light-weight, and shaped to avoid causing irritation, deformity, or injury to the animal.

The tag 20 preferably has indicia or markings allowing it to be readily and uniquely identified visually even when attached to a livestock 12. For example, the tag 20 can have an outward-facing exterior surface with printed, inscribed, etched or otherwise applied indicia that uniquely identifies the tag 20 and distinguishes it from other tags 20 attached to other livestock 12. The indicia may include, but are not limited to, alphanumeric and/or symbolic representations. Different tags 20 also may have various different colors which may identify different models, types, classes, time periods placed in service, etc.

As described in detail below, the tag 20 is preferably self-powered and includes data generation, processing, storage, communications, control and other components, including code, to generate, collect and/or receive, process, retain, and communicate data regarding the individual livestock 12 to which it is attached.

Also as described in detail below, the tag 20 may be adapted and configured to locally process generated and/or received data relating to physical parameters of the livestock 12 to which it is attached, for example using one or more models, to determine the occurrence of various activities, behaviors and other physical parameters. Physical parameters may include, but are not limited to, livestock behaviors and activities such as resting, ambulation, eating/drinking, rumination, etc., and biometric parameters such as heart rate, blood oxygenation, relative internal body temperature, etc.

Example embodiments of the livestock age verification system 10 also may include one or more sensors 30. Each sensor 30 may be part of a tag 20 or may be separately attached to or implanted in a livestock 12. A plurality of different sensors 30 may be distributed between tag(s) 20 and being separately attached to or implanted in one or a plurality of livestock 12. Sensors 30 may comprise biometric sensors and may be adapted and configured to sense various biometric parameters of the livestock 12, including but not limited to, heart rate, blood oxygenation, internal temperature, etc. Sensors 30 can also comprise environmental condition sensors adapted and configured to detect environmental conditions, including but not limited to, temperature, humidity, and various gases, e.g., carbon. The physical parameters can be used alone, or in combination with other physical parameters, and/or in combination with environmental conditions data to determine and/or predict the age and/or a relative vigor metric of the livestock 12.

1. Enclosure

As illustrated in FIGS. 1A-1D, the tag 20 comprises an enclosure 22 with an attachment element 24. The enclosure 22 comprises a sealed interior space in which the data generation, processing, storage, communications, control and other elements and components of the tag 20 are enclosed so as to be protected against exposure to the external environment, potential contaminants, and potential damage. As described below, certain elements and components may have at least a portion thereof exposed externally of the enclosure 22.

The enclosure 22 is preferably constructed of a material that is inexpensive, light-weight, relatively rigid, resistant to damage and wear due to exposure to the external environment, and that will not cause chemical, biological, or physical irritation to the livestock 12 to which the tag 20 is attached. A number of commercially available plastic materials are suitable for these purposes.

Figure 1D:
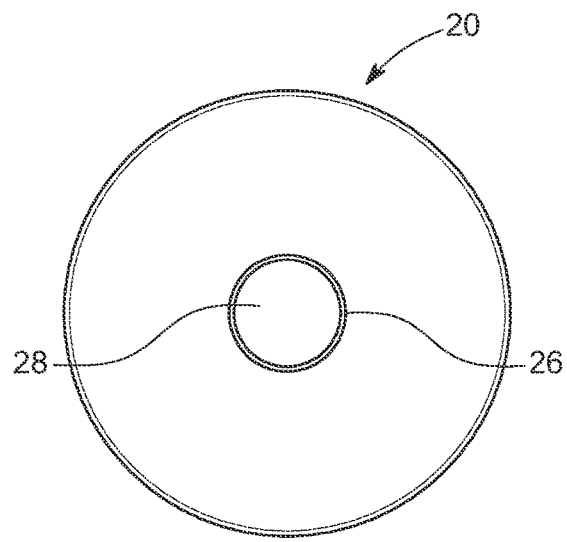
FIG. 1D is a back view of a tag of a livestock age verification system in accordance with an example embodiment.

The enclosure 22 may have any shape consistent with the foregoing purposes. In one example embodiment described herein, the enclosure 22 may have a substantially button-like cylindrical shape with a round cross-section and a relatively small depth dimension (see FIG. 1C) between the front exterior surface (FIG. 1B) and the rear exterior surface (FIG. 1D). Preferably, all of the peripheral edges of the enclosure 22 are beveled, rounded, or otherwise smooth to minimize any physical irritation to the livestock 12 to which the tag is attached.

The attachment element 24 may comprise a male element with an elongated shaft 26 and a pointed tip 28. Referring to FIG. 2, the male element is adapted to extend through one side of a portion of the outer ear or auricle 14 of the livestock 12 and securely engage with a backing element having a corresponding female element on the opposite side of the outer ear or auricle 14. The tip 28 is preferably pointed to facilitate piercing and extending through the tissue of the outer ear or auricle 14 with minimal tearing or other damage to the tissue. The tag 20 can be firmly attached to the outer ear or auricle 14 in a manner and using a tool familiar to those skilled in the art.

Firm engagement of the tag 20 against the ear is preferred to help reduce the potential for injury to the ear and discomfort to the animal from foreign debris lodging between the tag 20 and the ear, or from the tag 20 getting snagged on something. In addition, firm engagement against the ear helps prevent the tag 20 from rotating or moving upward or downward relative to the livestock 12 as it moves. This in turn helps to reduce the introduction of errors in the orientation and elevation data generated by the tag 20, as described in further detail herein, due to movement of the tag 20 itself separate from the livestock 12 to which it is attached.

The male and female elements are preferably configured so that the tag 20 is selectively attachable to and detachable from the livestock 12. More particularly, the male and female elements may and preferable do include corresponding quick-connect and disconnect features to enable the tag 20 to be easily and quickly attached to and removed from the livestock 12. This beneficially allows the tag 20 to be selectively detached, for example if necessary to replace a battery of the tag 20, or if the livestock 12 to which the tag 20 is attached dies or otherwise ceases to be under management, and then to be re-attached to the same or a different livestock 12.

Alternatively, the male and female elements may be configured and adapted for permanent and one-time only attachment of the tag 20 to a livestock 12. In that case upon detachment one or both of the male and female elements may be rendered physically incapable of being re-attached to the other and thus prevent the tag 20 from being re-attached to the same or a different livestock 12.

As noted above, certain elements and components of the tag 20 may have at least a portion thereof exposed to the environment external to the enclosure 22. For example, an external energy collector may have a portion, such as a solar energy cell, exposed in an exterior surface of the tag 20 as shown and described in the published applications incorporated herein by reference. Other environmental sensors, such as a temperature, humidity, and/or gas sensor, also may be exposed to the external environment through the enclosure 22.

2. Elements and Architecture

Figure 3:
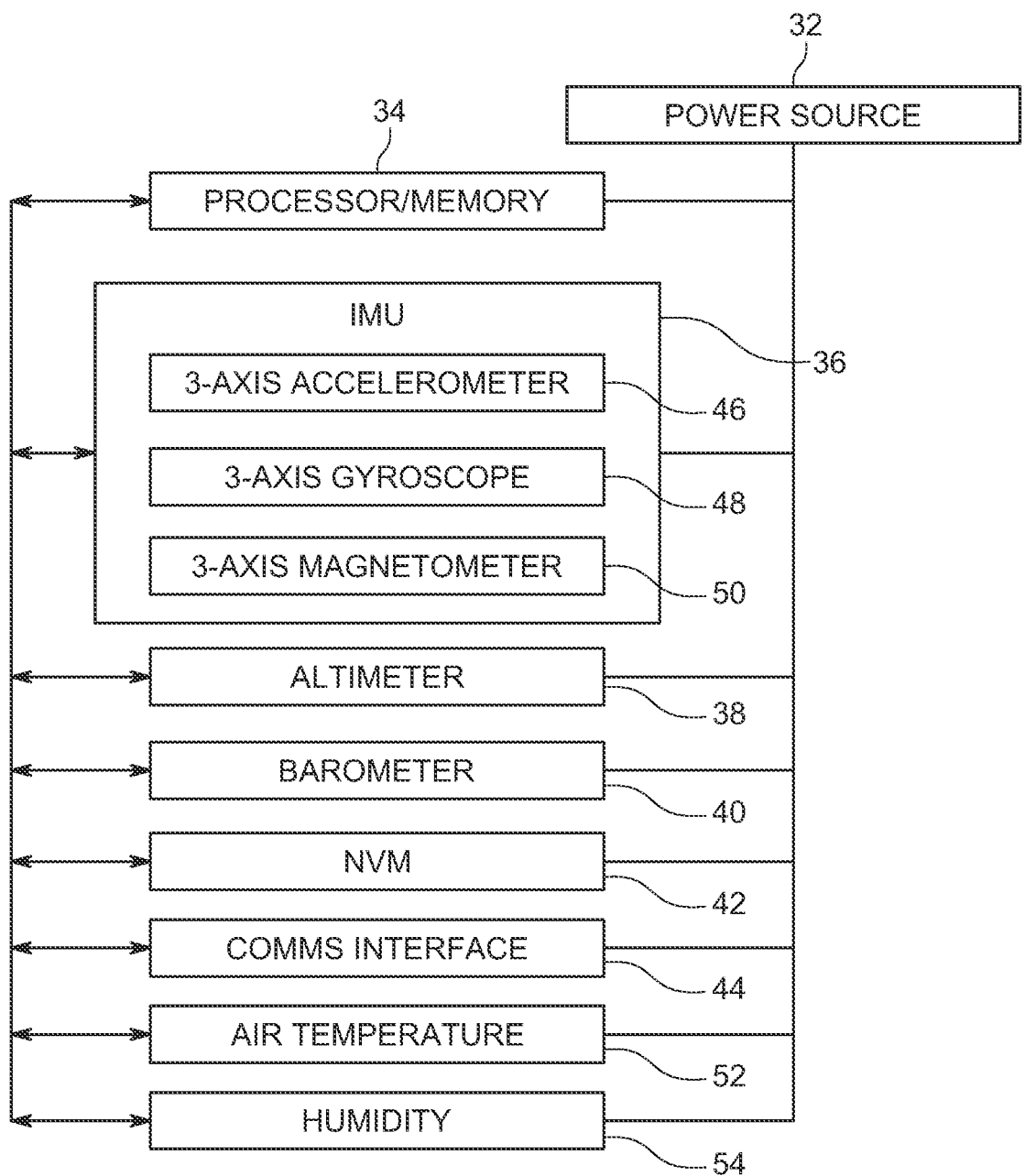
FIG. 3 is a block diagram illustrating the elements and architecture of a tag of a livestock age verification system in accordance with an example embodiment.

Referring to FIG. 3, the tag 20 comprises a power source 32. The power source 32 is electrically connected to and provides electrical power for the other electronic components of the tag 20 such that the tag 20 is self-powered. The power source 32 may comprise one or more suitable batteries, particularly if there is a desire for the tag 20 to be relatively small and light weight. Preferably the electronic elements and components of the tag 20 will consume as little power as possible in normal operation, preferably less than a few milliwatts (mWs) on average, so that long battery life can be achieved.

Alternatively, or in addition, the power source 32 may comprise an external energy collector. The external energy collector may comprise, for example, a solar cell exposed in an exterior surface of the enclosure 22 of the tag 20. The external energy source may also include other electrical elements, e.g., regulators, etc., to provide power for the electronic components of the tag 20 directly, or to provide power to recharge a battery, or both, as shown and described in the published applications incorporated herein by reference. The details of these additional electrical elements are deemed included herein as if set forth verbatim, and need not be repeated.

The tag 20 also comprises various electronic elements and components for generating, processing, storing, and communicating data which the livestock age verification system 10 can use to determine or predict the birth date and the age of the livestock 12 to which the tag 20 is attached for age verification or other purposes, as well as to generate a relative vigor metric.

The tag 20 comprises a processor and memory element 34 and a non-volatile memory (NVM) 42. The processor of the processor and memory element 34 communicates with, controls, and manages the operation of the various other components and elements of the tag 20 identified herein and illustrated in FIG. 3. The memory of the processor and memory element 34 provides temporary storage for an operating system, for run-time computations by the processor, for data generated, received and/or recorded by various components of the tag 20 described herein, as well as for programs, applications, models, etc. to be executed by the processor. The NVM 42 provides long term storage for certain unchanging or infrequently changing parameters, settings, data, etc. related to the livestock 12 and to the operation of the tag 20 itself, e.g., an operating system, a BIOS, programs, applications, models, and related parameters and data, etc. that are desired to reside permanently or semi-permanently in the tag 20. Additional details relating to the processor and memory unit 34 and the NVM 42, including their communications and interactions with the other elements and components of the tag 20 illustrated in FIG. 3, are as set forth in the published applications incorporated herein by reference. As such they are deemed to be included herein as if set forth verbatim and need not be repeated.

The tag 20 also comprises an inertial measurement unit (IMU) 36. The IMU 36 is a type of sensor that senses or detects motion and orientation of the tag 20 and generates data indicative thereof. The IMU 36 typically comprises a three-axis accelerometer 46, a three-axis gyroscope 48, and a three-axis magnetometer (compass) 50. The accelerometer 46, the gyroscope 48, and the magnetometer 50 together generate data that indicates when the livestock 12 is in motion and at rest. The data also indicates the relative direction of the motion in three-axes, e.g., up-down, left-right, forward-back, the angular components of the motion in three-axes, e.g., pitch, roll, and yaw, and the direction of the motion relative to the Earth, e.g., North, South, East, West. The data also includes the relative magnitude of the linear and angular components of the motion. The IMU 36 data can be related to and used to determine motion-related physical parameters of the livestock 12 to which the tag 20 is attached. In turn the motion-related physical parameters can be used to predict or determine the birth date and age of the livestock 12, provide age verification for the livestock 12, and generate vigor and relative vigor metrics for the livestock 12 as described in further detail below.

The tag 20 also comprises a communications (COMMS) interface 44. The COMMS interface 44 provides interfaces to one or more communication channels over which the tag 20 can communicate. These include channels for communicating with one or more sensors implanted in and/or attached to the livestock 12, with one or more local sensors 47, with a data processor 120 as described herein, and with a location detection system (LDS) 100 also as described herein. Additional communication channels for global positioning and/or data network satellites, etc. may also be included if desired. The COMMS interface 44 is described in additional detail below with reference to FIG. 4.

The tag 20 also may comprise an altimeter 38, and one or more other sensors for sensing conditions of the external environment, such as a barometer 40, an air temperature sensor 52, and/or a humidity sensor 54. The tag 20 can also include other environmental condition sensors such as a carbon gas concentration sensor. As described further herein, the livestock age verification system 10 can use such environmental conditions data together with the IMU 36 data to generate a vigor metric or score and relative vigor metrics for the livestock 12. Additional details relating to the altimeter 38, barometer 40, air temperature sensor 52, and humidity sensor 54 and their communications with the processor and memory unit 34 are as set forth in the published applications incorporated herein my reference and therefore need not be repeated here.

The tag 20 also may include one or more biometric sensors 30, such as those identified previously, that generate data related to biometric physical parameters of the livestock 12, e.g., heart rate, blood oxygenation, internal temperature, etc. Alternatively, one or more of the sensors 30 may be separately implanted in or attached to the livestock 12 as illustrated in FIG. 2 and the tag 20 can communicate with the separately implanted or attached sensors 30 via a communication channel of the COMMS interface 44, e.g., a Bluetooth or RFID channel. Further details of the sensors 30 are as described in the published applications incorporated herein by reference. As such, they are deemed included herein as if set forth verbatim and need not be repeated. As described further herein, the biometric data correlated in time with the IMU 36 data can be used to predict or determine the birth date and age of the livestock 12, provide age verification for the livestock 12, and generate vigor and relative vigor metrics for the livestock 12.

The tag 20 also may comprise one or more of a plurality of other electronic elements and components depending on the uses to which the tag 20 is desired to be put, the features desired, size limitations, and power considerations. These may include, for example, one or more LED's, a microphone (MIC), a tone generator and speaker, a livestock stimulator, and/or a camera, etc. Structural and functional details of these additional elements and components, if included, are as shown and described in the published applications incorporated herein by reference. As such, they are deemed included herein as if set forth verbatim and need not be repeated.

Figure 4:
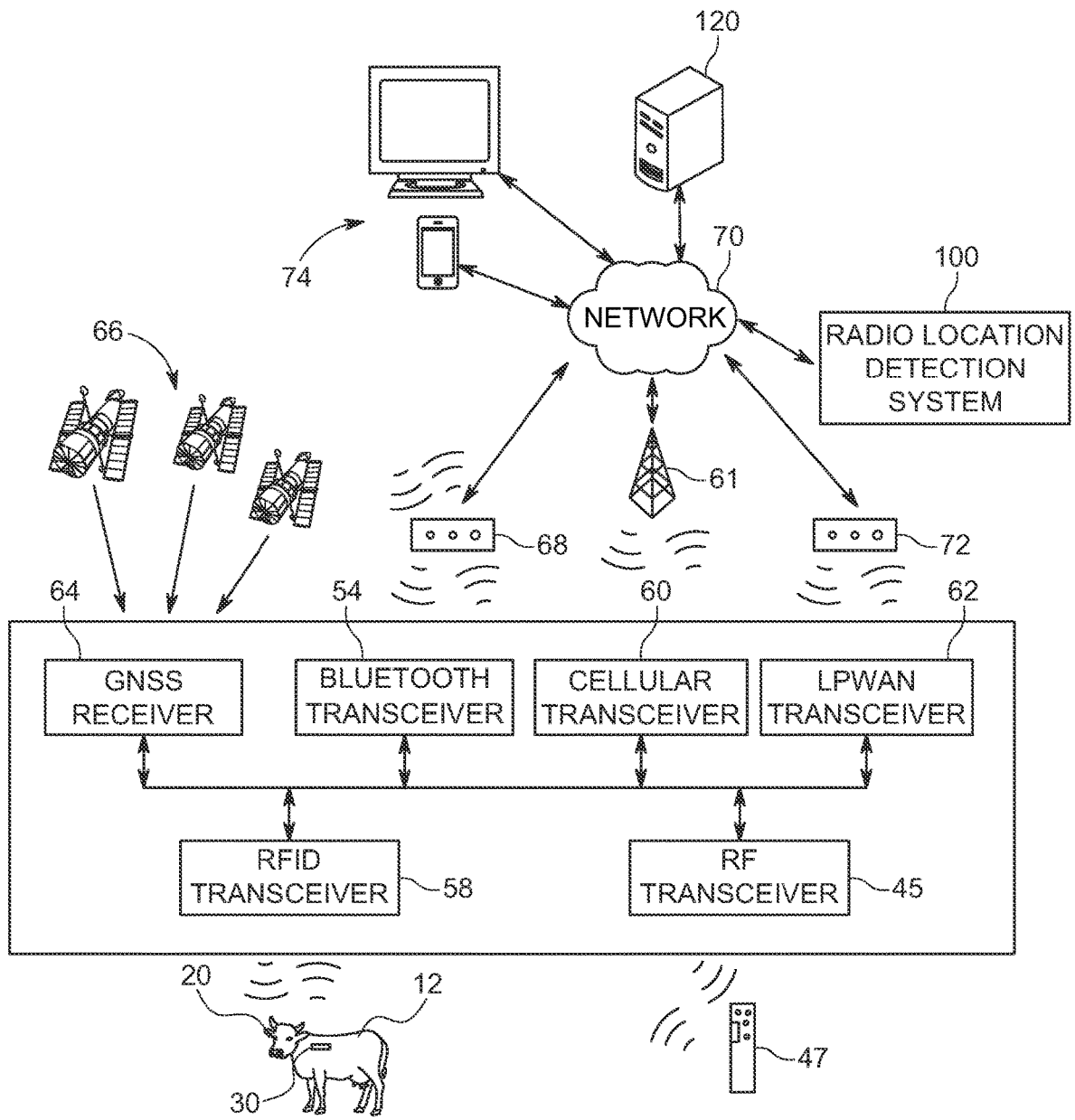
FIG. 4 is a combination block and graphical diagram illustrating the elements and architecture of a communications interface of a tag of a livestock age verification system and the communication relationships between the communications interface and other elements of the system in accordance with an example embodiment.

Referring to FIG. 4, each tag 20 is adapted and configured to communicate via its COMMS interface 44 with one or more sensors 30 implanted in and/or attached to the livestock 12 to which the tag 20 is attached, with one or more local sensors 47, with a data processor 120, and with a location detection system (LDS) 100. The COMMS interface 44 of each tag 20 can include a Bluetooth transceiver 56 and/or an RFID transceiver 58, and/or another similar short range wireless communication transceiver, e.g., Wi-Fi transceiver. The tag 20 may use one or more of these short range wireless transceivers to communicate with the sensors 30, local sensors 47, and/or other nearby electronic elements of the livestock age verification system 10 having corresponding transceivers, as desired.

In addition, it is contemplated that in some arrangements of the livestock age verification system 10, a short range wireless transceiver, e.g., Bluetooth 56, RFID 58, or Wi-Fi transceiver, can be used by the tag 20 to communicate over longer distances with the data processor 120. In these arrangements, a Bluetooth, RFID or Wi-Fi transceiver can be embedded in one or more gateways or hubs 68 in one or more areas or locations where the livestock 12 and hence the tag 20 may be present. The gateways/hubs 68 in turn may have one or more wireless and/or wired connections to one or more other data networks 70 to which the data processor 120 is connected. Such other networks may include, for example, a TCP/IP-based LAN or an HTTP-based WAN such as the Internet. Alternatively, or in addition, one or more gateways/hubs 68 could include a cellular transceiver and connect to a data network 70 to which the data processor 120 is connected via a cell tower 61 and cellular network. The gateways/hubs 68 thus provide nearby tags 20 that are within Bluetooth, RFID, or Wi-Fi signal range with at least one longer range communication channel for the tags 20 to wirelessly and directly communicate with the data processor 120.

The COMMS interface 44 also can include a cellular network transceiver 60, an LPWAN transceiver 62, a satellite data network transceiver, and/or another similar longer range wireless transceiver. The tag 20 may use one or more of these transceivers, if included, to wirelessly communicate with the data processor 120, the radio location detection system 100, and/or other electronic elements of the livestock age verification system 10 over relatively longer distances than are possible with the short range wireless transceivers. For example, a cellular network transceiver 60 can communicate wirelessly with the data processor 120 over a range of many miles, via one or more cell towers 61 and known cellular networks, e.g., CDMA, LTE, etc. This can be particularly beneficial, for example if the livestock 12 is present in a remote or open range location. The cellular network transceiver 60 can communicate with the data processor 120 directly, or via an intermediary data network 70 to which the data processor 120 is connected.

Alternatively, or in addition to, a cellular network transceiver 60, the COMMS interface 44 could include a satellite data network transceiver. Similar to a cellular network transceiver 60, a satellite data transceiver can wirelessly communicate data between a tag 20 and the data processor 120 over relatively long distances, except using one or more known satellite data networks rather than a cellular network. Similar to a cellular network transceiver 60, a satellite data network transceiver could communicate with the data processor 120 directly, or via an intermediary data network 70 to which the data processor 120 is connected.

Similar to the cellular and satellite network data transceivers, an LPWAN transceiver 62, if included, can be used by the tag 20 to wirelessly communicate data with the data processor 120 over relatively long distances. A number of low-power LPWAN transceivers 62 are known and commercially available. Also like the cellular and satellite network data transceivers, an LPWAN transceiver can communicate data with the data processor 120 directly or indirectly via one or more LPWAN gateways 72, one or more intermediate cellular and/or satellite data networks, and via one or more data networks 70, e.g., LAN and/or WAN networks.

The COMMS interface 44 of each tag 20 can also include a global navigation satellite system (GNSS) receiver 64, if desired. The GNSS receiver 64, if included, receives global satellite positioning signals from satellites 66 and determines from the signals the position of the tag 20 and hence the livestock 12 to which it is attached in terms of latitude and longitude. The tag 20, and more generally the livestock age verification system 10, can use the satellite livestock position data as a supplement to or partial replacement for some of the data generated by the IMU 36 to determine movement and activity of the livestock 12. The tag 20, and more generally the livestock age verification system 10, can use the satellite livestock position data in addition to or in conjunction with the data generated by the IMU for that purpose. In addition, the livestock age verification system 10 can use the satellite position data in addition to or in place of livestock 12 position data generated by the LDS 100 described herein. As described further herein, the tag 20 can process the satellite livestock position data and/or the IMU 36 data locally, partially or entirely, and/or can communicate it partially or entirely to the data processor 120 for processing.

It is contemplated that the tag 20 can communicate data via the COMMS interface 44 with one or more other electronic devices 74 in addition to and in the same manner as the data processor 120. Such devices can include, for example, desktop computers, mobile computers, mobile phone devices, and other fixed and mobile digital devices. In addition, it is contemplated that such devices can be completely separate from the data processor 120, can be networked with the data processor 120, or can be a virtual or logical element or component of the data processor 120.

The COMMS interface 44 of each tag 20 also preferably includes an RF transceiver for the tag 20 to communicate with the LDS 100 as described herein. The RF transceiver 45 should be of a suitable size to embed within the tag 20 and should be able to transmit and receive RF signals with the LDS 100 sufficiently for the LDS 100 to perform radio location detection techniques on the signals to determine position-related data for the tag 12 and the livestock 12 to which it is attached as described herein.

One or more local sensors/transceivers 47 may be located in one or more places where the livestock 12 may be present from time to time. The tag 20 is preferably adapted and configured to communicate data with the local sensors/transceivers 47 via one or more channels of the COMMS interface 44, for example Bluetooth 56 or RFID 58. However, the local sensors/transceivers 47 may also be configured to communicate directly with the data processor 120 in the same manner as described herein with respect to the tag 20. This arrangement may be desirable, for example in embodiments in which the tag 20 and the data processor 120 are configured for the data processor 120 alone to generate vigor and relative vigor metrics and/or in embodiments in which it is desired to reduce tag 20 power consumption as much as possible. The local sensors/transceivers 47 may be located at and/or connected with various items, for example a scale, feed or water station, etc., and are adapted and configured to generate and communicate data related thereto, such as the weight of the livestock 12 or the time the livestock 12 spent at a feed or water station.

Further details of the structure and functionality of the components and functionality of the COMMS interface 44, including the Bluetooth transceiver 56, the RFID transceiver 58, the cellular data network transceiver 60, the satellite data network transceiver, the LPWAN transceiver 62, and the GNSS receiver 64, if included, are as shown and described in the published applications incorporated herein by reference. These additional details are thus deemed included herein as if set forth verbatim and need not be repeated.

3. Functions, Data, and Logical Flow

Figure 5:
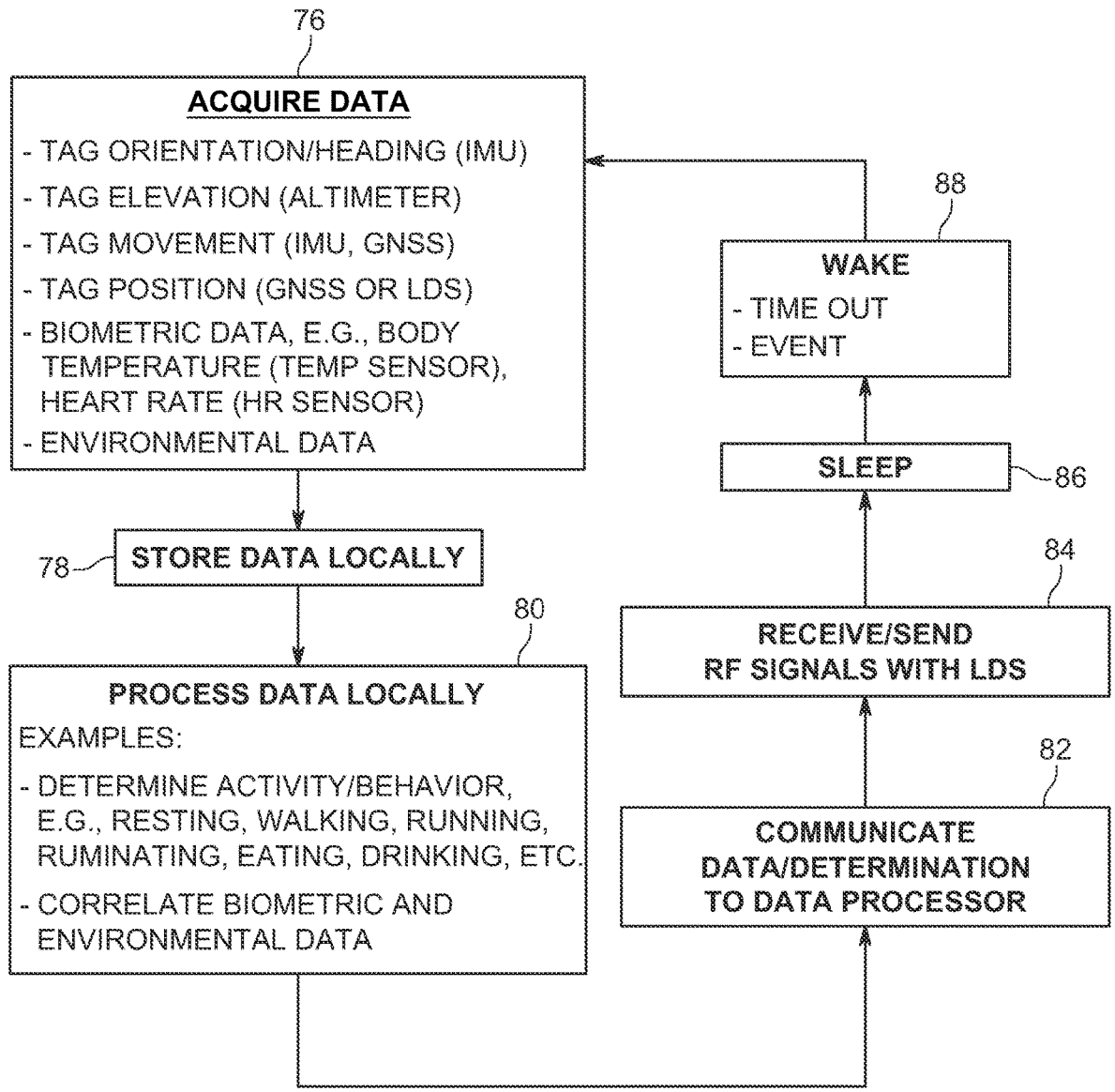
FIG. 5 is a functional block diagram for a tag of a livestock age verification system in accordance with an example embodiment.

Each tag 20 is adapted and configured to autonomously and automatically generate or acquire, process, retain, and communicate data about the individual livestock 12 to which it is attached to enable the livestock age verification system 10 to determine or predict the birth date and the age of the livestock 12 in order to verify a stated birth date and/or age, and to generate a vigor metric or score and a relative vigor metric for the livestock 12. Each tag 20 can also be configured to retain, predict, or determine the birth weight and subsequent weight of the livestock 12 in order to verify a stated weight. The tag 20 generally carries out its functions according to a logical flow, one example of which is illustrated in FIG. 5. It will be appreciated that many variations are also possible and such variations are intended to be encompassed within the scope of the disclosure to the extent they are consistent with carrying out the purposes and functions of the tag 20 as described herein. In addition, it should be appreciated that the flow illustrated in FIG. 5 is logical in nature and is not intended to be interpreted as necessarily requiring a linear and sequential flow of all of the steps and/or activities illustrated and described. Rather, multiple steps and/or activities illustrated in FIG. 5 may be carried out in various orders and simultaneously or sequentially.

As shown in block 76, a function of the tag 20 is to read and acquire data. This includes the orientation and motion-related data generated by the IMU 36, the biometric data generated by one or more of sensors 30, the environmental conditions data generated by one or more of sensors 38, 40, 52, and 54, and other data generated by local sensors 47. The IMU 36 data can include relative linear direction in three-axes, relative angular direction in three-axes, heading in terms of N, S, E, and W, and the magnitude of the relative linear and angular components of the motion. The sensor 30 biometric data can include heart rate, blood oxygenation, internal body temperature, etc., depending on the sensors used. The environmental condition data can include altitude, air pressure, air temperature, relative humidity, carbon gas concentration, and other environmental condition data, depending on the sensors used. The local sensor 47 data can include, e.g., weight, presence at a feed/water station, etc.

The read and acquire data function may also include reading or acquiring the position of the tag 20 and the livestock 12 to which it is attached. The position may be a relative position, i.e., a current position relative to a previous position, an absolute position, or both. The tag 20 can derive or approximate its current position relative to a previous position from the linear and angular direction and acceleration components generated by the IMU 36 at the current and previous times. From these components and the time difference between the previous and current position, the tag 20 can determine the relative direction, the direction in terms of N-S-E-W, and the approximate linear distance between the current and previous positions.

Another and more direct way the tag 20 can acquire both relative and absolute position data is from the LDS 100. As described in further detail below, the LDS 100 can use radiolocation techniques to determine the absolute position of a tag 20 in terms of Earth coordinates, i.e., latitude and longitude. The tag 20 and the LDS 100 can be adapted and configured to communicate this information between them. The tag 20 can also determine its relative position at a current time compared to its previous position at a previous time simply by comparing the coordinates of the positions at the current and previous times. Thus, among other things, the tag 20 can readily determine the direction and linear distance between its current position and a previous position.

Still another and even easier way the tag 20 can acquire both relative and absolute position data is to read it directly from a GNSS receiver 64, if the tag 20 includes one. The GNSS receiver directly provides the absolute position of the tag in Earth coordinates, i.e., latitude and longitude. The tag 20 can readily determine both its relative position at a current time compared to its position at a previous time and the direction and linear distance between its current position and a previous position using the coordinates provided by the GNSS receiver 64 at the current and previous times.

The tag 20 preferably is adapted and configured to read and acquire data from the IMU 36 and from the various sensors and other data sources described above on a periodic basis. The time interval at which the tag 20 reads data may be determined and set based on the desired granularity of the data, data storage and communication limitations, and power considerations. Further, it will be appreciated that the tag 20 need not read all data at the same intervals. For example, data from the IMU 36 and biometric data sensors 30 may be read at relatively shorter intervals, e.g., on the order of seconds or minutes, in order to capture movement indicative of certain activities and behaviors of the livestock 12. Data from the various sensors that generate environmental condition data may be read at relatively longer intervals, e.g., on the order of hours, on the assumption that environmental conditions are unlikely to change as quickly. Moreover, it will be appreciated that the intervals need not necessarily be permanently fixed but may vary. For example, the tag 20 may be configured to read data from the IMU 36 at shorter time intervals during daylight hours, when the livestock 12 is more likely to be active, and at longer intervals during night time hours, when the livestock 12 is less likely to be active.

In addition to the data generated by the biometric sensors 30 and the various environmental condition sensors 38, 40, 52, and 54, the tag 20 also can read and acquire via the COMMS interface 44 other data from one or more local sensors/transceivers 47 located in an area where the livestock 12 is present. For example, such data can include, but is not limited to, the weight of the livestock 12 from a scale, the presence of a livestock 12 and time spent at a feed or water station, etc. Such additional data can be used by the livestock age verification system 10, and more specifically the tag 20 and/or the data processor 120, to verify a stated weight of the livestock 12 and/or to generate a vigor metric or score and a relative vigor metric for the livestock 12.

The tag 20 also can receive data or information from the data processor 120 or a component thereof, such as a mobile digital device 74. For example, prior to or at the time the tag 20 is first attached to the livestock 12, the tag 20 can receive certain data or information that is intended to remain permanently or semi-permanently with the tag 20. Such data can include, for example, a tag ID, tag encryption keys, an asset number or identifier for the livestock 12 to which the tag 20 is to be attached, the birth date of the livestock 12 as detected by a tag attached to the livestock's mother and communicated to the data processor 120, and other permanent or semi-permanent data items. The tag 20 can also receive data from the data processor 120 that was communicated to the data processor 120 directly by one or more local sensors 47, and by other tags attached to other livestock.

As shown in block 78, another function of the tag 20 is to store or maintain data locally in the tag 20. The tag 20 may store some or all of the data in its volatile and/or non-volatile memories, depending on the type of data, e.g., temporary or permanent. The stored data can be used by the tag 20 and/or the data processor 120 of the livestock age verification system 10 to determine the birth date and age of the livestock 12, to provide age and/or weight verification of the livestock 12, and to generate vigor and relative vigor metrics for the livestock 12, all as described herein. The tag 20 is preferably adapted and configured to store each instance or sample of an item of data that is read or otherwise acquired repeatedly over time, e.g., angular and linear movement and magnitude data, location-related data, orientation, heading, heart rate, internal temperature, blood oxygenation, weight, environmental condition data, etc., locally in the memory of the processor and memory element 34 together with the corresponding date and time each such instance or sample was acquired. The tag 20 may also be configured to store determinations and predictions generated by the tag 20 while processing the data, as described further below. It will be appreciated that the tag 20 can be configured to apply data filtering techniques to the data before or as it is stored in order to remove noise and anomalies, and to reduce the volume of data to be stored. An example logical structure for the data and information acquired and stored by the tag 20 is shown in FIG. 6 and is described below.

As shown in block 80, another function of the tag 20 is to process data locally. The tag 20 can be configured to process some or all of the acquired and/or stored data locally. To the extent the tag 20 processes data locally, it is preferably configured to process such data automatically and autonomously. As described further below, the tag 20 can be configured to process certain data, and to communicate other data to the data processor 120 for processing. In some embodiments, the tag 20 may be configured to process no data locally beyond aggregating the data and communicating it to the data processor 120 for processing.

The tag 20 may be configured to process data generated by the IMU 36 to determine the occurrence of certain activity and/or behavior by the livestock 12 that is indicative of the birth date and age of the livestock 12. The tag 20 may further be configured to predict or determine the birth date and age of the livestock 20 from the determined activity and/or behavior. The age as determined by the livestock age verification system 10, i.e., the tag 20 and/or the data processor 120, can be readily compared with a stated age for the livestock 12 provided to a breed association or potential buyer, for example, to verify that the stated age is accurate. The determined or predicted birth date and supporting data can be stored in the tag 20 permanently if desired to facilitate repeat age verification requests at future times.

More specifically, the tag 20 may be configured to analyze the motion-related data generated by the IMU 36 over a period of time and to recognize a pattern in which the livestock 12 was substantially stationary and at rest for several weeks, followed by a relatively sudden and substantial burst of movement and activity for a period of time after that. Such behavior has been observed and documented by persons skilled in the art as characterizing the first several weeks to a month or so of life for most new born bovine calves. Accordingly, the tag 20 may be configured to recognize that pattern of inactivity followed by activity and to predict or determine the approximate birth date and age of the livestock 12 from it. It will be appreciated by persons skilled in the art that the same or a similar analysis may be applicable to livestock other than bovines, and that other patterns of activity or other physical parameters of livestock can be analyzed similarly to determine or predict birth date and age.

The foregoing assumes that the tag 20 is attached to a newborn livestock, e.g., a bovine calf, at the time of or shortly after the livestock is born. This is not a substantial concern since livestock managers typically maintain a close watch on their livestock during calving season and are unlikely to overlook or miss the birth of a calf for very long. Alternatively, or in addition, the mother of the newborn livestock may be fitted with a tag that is configured to detect the birth or impending birth of the livestock and alert a livestock manager. The details of such tag functionality are as described in the disclosures of the published applications incorporated herein by reference, are deemed disclosed herein as if set forth verbatim, and need not be repeated here.

It will be appreciated that in some example embodiments, the corresponding birth date as determined from the tag attached to the mother of the livestock 12 may be stored in the tag 20 in addition to the birth date determined from activity/behavior of the livestock 12 as described above. In such an embodiment, the tag 20 can be configured to deal with the two differently-determined birth dates in any desired manner. For example, the tag 20 can be configured to prefer one date over the other in determining the age of the livestock 12 and performing age verification. Alternatively, the tag 20 can be configured to use one determined date as a secondary check on the other determined date to improve the accuracy of the system 10.

The tag 20 can also be configured to correlate biometric data generated by one or more of the sensors 30 with the motion-related data generated by the IMU 36 to determine or predict the birth date and age of the livestock 12. For example, the tag 20 can be configured to correlate heart rate data generated by a sensor 30 with motion data generated by the IMU 36 to determine that the livestock 12 was substantially stationary and at rest with a resting heart rate for several weeks and then had a relatively sudden and substantial burst of motion and activity correlated in time with an elevated heart rate for a period of time after that. Similarly, the tag 20 can be configured to correlate internal temperature data and/or blood oxygenation data generated by a sensor 30 with IMU 36 motion data indicating the livestock 12 was substantially stationary and at rest for several weeks with a baseline resting internal temperature and/or blood oxygenation level, followed by a relatively sudden and substantial burst of motion and activity for a period of time correlated in time with an increase in internal temperature and/or blood oxygenation level indicative of substantial activity. It will be appreciated by persons skilled in the art that the specific biometric data discussed herein is merely exemplary and that other biometric data can be used in a similar manner.

The tag 20 can also be configured to process the location data generated by the LDS 100 and/or the GNSS receiver 64, if available, to determine or predict the birth date and age of the livestock 12. For example, the tag 20 can be configured to analyze the LDS and/or GNSS location data over a period of time and to recognize a pattern in which the livestock 12 does not substantially change location for a period of several weeks, indicative of the livestock 12 being substantially stationary and at rest, followed by frequent occurrences of and perhaps relatively large differences in location for a period of time after that, indicative of a substantial increase in motion and activity of the livestock 12. The tag 20 can thus determine or predict the approximate birth date and age of the livestock 12 from this recognized pattern of position data in the same manner as described above with regard to the IMU 36 motion-related data. Also, in the same manner as described above, the tag 20 can be configured to correlate biometric data from the sensor(s) 30 with the position data to determine or predict the birth date and age of the livestock 12.

The tag 20 can also be configured to analyze the IMU 36 motion-related data and/or the location-related data generated by the LDS 100 and/or GNSS receiver 64, if available, generated over a period of time to determine when and for how long the livestock 12 is engaged in various physical activities and behaviors, e.g., resting, walking, running, eating, during that period of time. These determinations can provide a measure of the vigor of the livestock 12 and can be used to generate vigor and relative vigor metrics for the livestock 12. For example, a livestock 12 that is determined to spend more time than another livestock walking, running, and eating, and less time stationary or resting during a given period of time may be deemed to have better vigor than the other livestock.

The IMU 36 can typically generate not only data that indicates the presence and direction of motion of the livestock 12, but also the relative magnitude of the linear and angular components of the motion, i.e., relative acceleration. The tag 20 can be configured to determine certain physical parameters of the livestock 12 from the motion data and the relative magnitudes of the linear and angular components, including determining certain activities and behaviors by the livestock 12. For example, the tag 20 can determine whether the livestock 12 is in motion or is stationary, and if it is in motion the type of motion, e.g., walking, running, eating/drinking, etc. For example, little or no detected linear motion data from the IMU 36 would indicate the livestock 12 is substantially stationary. Relatively low values of forward linear motion and acceleration detected together (perhaps also with frequent changes in direction) would indicate a grazing activity or behavior, i.e., eating, as livestock tend to move slowly forward while grazing. Even in the absence of linear motion data, angular motion and orientation data in the pitch, roll, and yaw axes would indicate the livestock 12 is dipping its head downward, indicating eating or drinking. A detected increase in the magnitude of the linear component from little or no magnitude to a greater magnitude would indicate the livestock 12 has transitioned from being stationary to ambulation, e.g., walking or running. A smaller magnitude increase would indicate walking whereas a larger magnitude increase would indicate running. The opposite can also be detected as the livestock 12 transitions from running to walking to stationary.

Figure 11A:
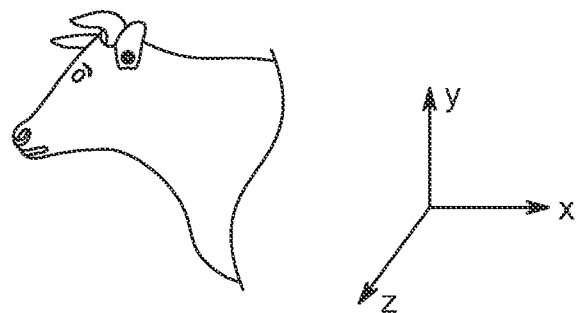
FIG. 11A is a partial graphical representation of a livestock illustrating a correlation between one orientation of a tag of a livestock age verification system and an activity or behavior of the livestock for determining age and/or vigor of the livestock in accordance with an example embodiment.

Referring to FIG. 11A, for example, a livestock 12 that is standing or ambulating will typically have a first orientation relative to three axes, e.g., pitch, roll, and yaw. In addition, as the livestock 12 ambulates, the orientation of the tag 20 along the axes may decrease and increase slightly and periodically as the livestock's head and body pitches slightly up and down. The tag 20 can determine ambulation by detecting this pattern in accompanied by the presence of a linear motion component from the IMU 36. The tag 20 can also determine step counts, etc. from such data.

Figure 11B:
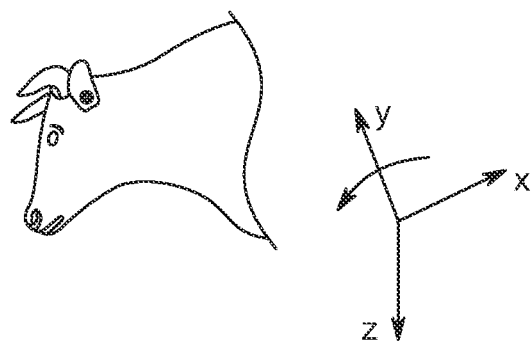
FIG. 11B is a partial graphical representation of a livestock illustrating another correlation between another orientation of a tag of a livestock age verification system and an activity or behavior of the livestock for determining age and/or vigor of the livestock in accordance with an example embodiment.

Similarly, as shown in FIG. 11B, a livestock 12 that is ruminating will typically have a second orientation wherein the pitch, roll, and yaw axes are rotated or pivoted 21 somewhat downward in relation to the first orientation as shown in FIG. 11A. Thus, the tag 20 can similarly determine rumination by detecting changes in angular motion and orientation along the three axes from the IMU 36.

Figure 11C:
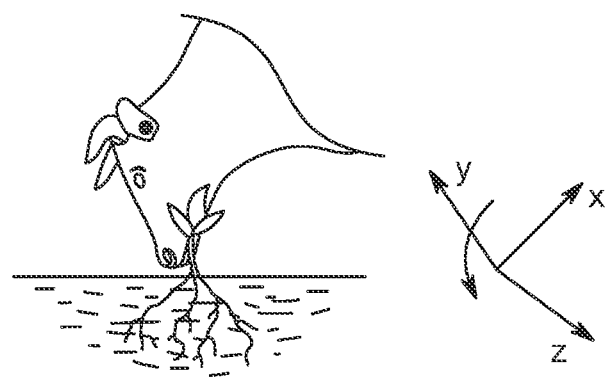
FIG. 11C is a partial graphical representation of a livestock illustrating another correlation between another orientation of a tag of a livestock management system and an activity or behavior of the livestock for determining an age and/or vigor of the livestock in accordance with an example embodiment.

Also similarly, as shown in FIG. 11C, a livestock 12 that is eating/drinking will typically have a third orientation wherein the pitch, roll, and yaw axes are rotated or pivoted even further downward in relation to the first and second orientations as shown in FIGS. 11A and 11B. Thus, the tag 20 can similarly determine eating/drinking by detecting further changes of relatively greater magnitude in angular motion and orientation along the three axes from the IMU 36.

In addition to generating the orientation, linear/angular motion, and linear/angular magnitude or relative acceleration data described above, the IMU 36 can also measure other aspects of livestock 12 motion, including step count and average motion, for example. Such data can be used in predicting or determining birth date and age, and in generating a vigor metric or score in the same manner described herein with respect to other IMU 36 motion-related data.

In addition to using motion-related data from the IMU 36, the tag 20 can also be configured to use data from the altimeter 38, if available, to determine certain activity/behavior physical parameters of the livestock 12. As seen in FIGS. 11A-11C, the vertical elevation of the head of a livestock 12 above ground typically will be different depending on whether the livestock 12 is standing or ambulating, eating, or ruminating. In addition, livestock 12 typically ruminate while lying on the ground. The tag 20 can thus read and use the altimeter 36 data to determine changes in the elevation of the livestock's head (assuming the tag 20 is attached to the ear of the livestock 12) relative to the ground to determine and/or confirm whether and when the livestock 12 is engaged in these particular activities/behaviors.

The tag 20 can be configured to determine from the IMU 36 motion-related data not only when and whether the livestock 12 is engaged in a particular activity/behavior but how much time the livestock 12 spent engaged in that activity/behavior. The tag 20 can further be configured to determine the total or cumulative time the livestock 12 spent engaged in each activity/behavior over a given time period using the date and time data associated with each data sample acquired. The tag 20 can also be configured to determine the average time spent in each activity, the percentage of time spent in each, etc. The tag 20 can be configured to weight each activity in terms of its relative indication of the vigor of the livestock 12. The tag 20 can be configured to generate a vigor metric or score for the livestock 12 based on one or a combination of these determinations, as well as others that will be apparent to persons skilled in the art. Alternatively, the tag 20 can communicate the IMU 36 data and/or its activity/behavior determinations, and/or its determinations regarding the relative time determinations to the data processor 120 for generation of vigor and relative vigor metrics, as described below.

The tag 20 can also be configured to analyze the livestock 12 location data generated by the LDS 100 and/or GNSS receiver 64, if available, in order to determine when and for how long the livestock 12 engaged in various activities/behaviors. For example, the tag 20 can be configured to determine from substantially unchanged position data over time that the livestock 12 is stationary. Similarly, the tag 20 can be configured to determine from position data that changes very slowly and that perhaps meanders in direction that the livestock 12 is grazing, i.e., eating. Also similarly, the tag 20 can be configured to determine from position data that changes relatively slowly over time but in a more or less linear direction that the livestock 12 is walking, and from position data that changes somewhat more rapidly over time that the livestock 12 is running. Since each data sample includes the date and time it was acquired, the tag 20 can be configured to cumulate or otherwise characterize the time the livestock 12 spent engaged in each activity/behavior during a period of time in the same manner as described above. The tag 20 can be configured either to generate a vigor metric or score or communicate some or all of the data and determinations to the data processor 120 to do so, or both.

The tag 20 can also be configured to correlate in time the motion-related data from the IMU 36, and/or the position-related data from the LDS 100 or the GNSS receiver 64, and/or the corresponding determinations of activity/behavior of the livestock 12 with environmental condition data generated by one or more of sensors 38, 40, 52, and 54 to generate a vigor metric or score. For example, the tag 20 can be configured to correlate IMU 36 data indicating the livestock 12 is engaged in an activity, e.g., resting, walking, running, eating, at a particular time with one or more items of environmental data like altitude, humidity, and air temperature acquired at the same time to generate the vigor metric or score for the livestock 12 in the presence of various environmental conditions and combinations of conditions. For example, a livestock 12 that is determined to have spent more time than another livestock being active during a given period of time in the presence of substantially the same altitude, humidity, and air temperature may be deemed to have a better vigor score or metric than the other livestock under similar conditions. It will be appreciated by persons skilled in the art that the specific environmental condition data discussed herein is merely exemplary and that other environmental condition data can be used in a similar manner.

The tag 20 can also be configured to similarly correlate in time the data generated by the IMU 36, LDS 100, or the GNSS receiver 64 indicating an activity/behavior of the livestock 12 with biometric data generated by one or more of the sensors 30 to generate a vigor metric or score for the livestock 12. For example, the tag 20 can be configured to correlate in time IMU 36 data indicating the livestock 12 is engaged in resting, walking, or running with biometric data, e.g., heart rate, blood oxygenation, internal temperature, etc., of the livestock 12 from one or more of the sensors 30 acquired at the same time to generate the vigor metric or score for the livestock 12. For example, a livestock 12 that is determined to have a lower heart rate and/or internal temperature than another livestock while engaged in the same activities may be deemed to have a better vigor metric or score than the other livestock.

The tag 20 can also be configured to use certain biometric data and determinations automatically obtained from a tag attached to the mother of the livestock 12 to generate a vigor metric or score for the livestock 12. For example, a tag attached to the mother of the livestock 12 can measure the stress level and duration of the calving process of the livestock through the use of various motion and biometric sensors in the tag attached to the mother, e.g., IMU, heart rate, blood oxygenation, and internal temperature sensors, and can determine from the measured data using a desired algorithm a "calving ease score." Such a "calving ease score" can be used by breed associations as a component of an expected progeny difference (EPD), i.e., vigor metric or score, so that potential buyers of the livestock have an idea if it produces calves that require no intervention and calve on their own, or require human assistance and need to be pulled out hard. The "calving ease score" can be determined on a scale of 1-5, for example, with 1 being no assistance and 5 being pulled hard. A "calving ease score" determined in this way can be more accurate than one manually determined and entered based on subjective observation. The tag 20 can receive the "calving ease score" directly from the tag attached to the mother or indirectly from the data processor 120.

The tag 20 can also be configured to correlate in time the data received from one or more local sensors/transceivers 47 with the data generated by the IMU 36, LDS 100, or GNSS receiver 64 indicating activities/behaviors of the livestock 12. For example, the tag 20 can correlate weight information received from a local sensor/transceiver 47 with activity/behavior data to generate the vigor metric or score for the livestock 12. For example, a livestock 12 that is determined to be more active and to weigh more than another livestock over a period of time may be deemed to have a better vigor score or metric than the other livestock.

The tag 20 can also be configured to use data concerning the weight of the livestock 12 as received from one or more local sensors/transceivers 47, the data processor 120, and/or other sources to verify the accuracy of a stated weight of the livestock 12 to a breed association or potential buyer. By storing individual measured samples of the weight of the livestock 12 in the tag 20 as described herein over a long period of time, the tag 20 can include weights for the livestock 12 at a plurality of times, including at or near its birth date, at weaning, and at yearling time. The tag 20 can be configured to compare the stored measured weights at selected times with stated weights for the same times to verify the accuracy of the stated weights. The tag 20 can also be configured to statistically analyze the measured stored weights and/or stated weights for the livestock 12 at selected times in relation to the weights of a plurality of other livestock of the same breed, sex, and age at the same times to determine if the measured and/or stated weights for the livestock 12 are within a normal range for such livestock and/or to generate a relative vigor metric for the livestock 12.

The tag 20 may comprise one or more artificial intelligence (AI) models and/or other detection algorithms embedded in its local memory and may be configured to execute one or more such models and/or detection algorithms with respect to one or more of the items of data acquired by the tag 20 to predict or determine the occurrence or existence and time spent by the livestock 12 in one or more of the physical activities or behaviors described herein. The models or algorithms may also be trained to make one or more of the various determinations described above from the predicted/determined activities/behaviors and the other data described, i.e., birth date, age, and/or vigor metric/score.

More specifically, the tag 20 can include one or more AI models and/or other detection algorithms that can predict or determine the existence of one or more physical activities and/or behaviors of the livestock 12 including, but not limited to, being stationary, resting, walking and running, e.g., ambulating, ruminating, and eating/drinking, from one or more of the acquired data items including, but not limited to, angular and linear motion, acceleration (magnitude), and orientation (from the IMU 36); elevation (from altimeter 38); and position change and rate of change over time (from the LDS 100 and/or GNSS receiver 64). The tag 20 can also include one or more AI models and/or other detection algorithms that are programmed and trained to correlate biometric data and/or environmental conditions data with the predicted or determined physical activities and/or behaviors of the livestock 12 to generate a vigor metric or score. More specifically, the AI models and/or other detection algorithms can be programmed and trained to correlate in time the livestock 12 activity/behavior data and determinations with livestock 12 biometric data including, but not limited to, heart rate, blood oxygenation, and/or relative internal temperature (from sensors 30) and/or environment condition data including, but not limited to, altitude (from altimeter 38), pressure (from barometer 40), air temperature (from air temperature sensor 52) and/or relative humidity (from humidity sensor 54).

The AI models and/or other detection algorithms embedded in the tag 20 can be created using suitable machine learning and AI model and/or algorithm creation and development tools at the data processor 120 or elsewhere. The AI models and/or other detection algorithms can be generated, trained, and updated from time to time using livestock data acquired and received by tags 20 attached to a plurality of livestock in various locations and conditions and/or using livestock data acquired from other sources. For example, livestock data can be acquired from physical tests and measurements carried out manually, visual observations and reports, etc. The livestock data can be aggregated and stored and the stored data can be used to create, develop, train, and update the AI models and/or other detection algorithms.

Referring to block 82, another function of the tag 20 is to communicate the acquired data and/or corresponding predictions or determinations with the data processor 120 and components thereof, including for example mobile or fixed digital devices 74. The tag 20 can be adapted and configured to communicate with the data processor 120 via one or more channels of the COMMS interface 44 as described herein. The tag 20 can also be configured to communicate all or a portion of the acquired data for processing by the data processor 120, and/or all or a portion of any predictions or determinations made by the tag 20. The tag 20 can be configured to communicate data and/or determinations autonomously on a periodic basis and/or the tag 20 can be configured to communicate on demand from the data processor 120.

The tag 20 is also preferably adapted and configured to communicate with the LDS 100 to determine position-related data, which can include but is not limited to, relative and absolute position, change in position, rate of change, direction, etc. The tag 20 can be configured to transmit and receive radio frequency (RF) signals with the LDS 100 via the RF transceiver. The LDS 100 can apply radio location detection techniques to RF signals transmitted by the tag 20 to determine the position-related data for the tag 20, and hence the livestock 20 to which it is attached, as described herein. The tag 20 can be configured to transmit RF signals to the LDS 100 autonomously on a periodic basis for the LDS to determine the position-related data. The tag 20 can also be configured to transmit RF signals on-demand in response to receiving an RF signals from the LDS 100.

Referring to block 84, another function of the tag 20 is to receive data and information. The tag 20 is preferably adapted and configured to receive data and information from the data processor 120 or a component thereof via the COMMS interface 44, as described herein, as well as from local sensors 47. As described herein, the data and information can include data that is desired to remain permanently or semi-permanently in the tag 20, such as a tag ID, tag encryption keys, and an asset number or identifier for the livestock 12 to which the tag 20 is to be attached. The tag 20 can also be configured to receive from the data processor 120 or a component thereof various unchanging information regarding the livestock 12 to which it is attached or is to be attached, e.g., sex, breed, birth date, etc. The tag 20 can receive such information at or before the time it is attached to the livestock 12. The tag 20 can also be configured to receive data and information from the data processor 120 to update programs, applications, models, and parameters stored in the tag 20.

The tag 20 may, but need not, be configured to receive the position-related data determined by the LDS 100 using radio location detection techniques. However, if the tag 20 is configured to receive the position-related data determined by the LDS 100, the tag 20 can also be configured to use the position-related data to make determinations about the activities and behaviors of the livestock 12 and to predict and/or determine the birth date and age of the livestock 12 and/or generate a vigor metric or score, all as described herein.

Referring to block 86, another function of the tag 20 can be to enter a sleep or low power state to reduce power consumption and/or conserve stored electrical energy. The tag is preferably adapted and configured to alternate between an active state in which it performs some or all of the functions described herein and a sleep or low power state. During the sleep or low power state, the tag 20 can shut down some or all operations, or reduce or limit the power certain components or operations are allowed to draw, in order to reduce the consumption of power and to conserve the stored electrical energy in the power source 32.

During an active state, the tag 20 can perform some or all of the functions described herein. The tag 20 can perform the same functions during each active state cycle or can perform different functions during different active state cycles. The interval between active and sleep states can be fixed or variable, including based on the level of energy remaining in power source 32. For example, the sleep state can be longer during expected periods of livestock 12 inactivity, e.g., at night, and shorter during the day. The active state would vary conversely. Also, for example, the tag 20 can dynamically determine and vary the time period of a sleep state and an active state based on power and other considerations.

Referring to block 88, another function of the tag 20 is to determine when to exit or wake from a sleep state. The tag 20 is preferably configured to exit or wake from a sleep state based on a time-out or time elapsed signal from a timer in the tag 20, for example a time in the processor/memory element 34, or based on receiving a signal indicating an internal or external event, such as receiving an RF signal from the LDS 100 or a signal or communication from the data processor 120. Once the tag 20 exits the sleep state, it can acquire, store, and process data and information, make determinations, etc. as described herein and as shown in FIG. 5.

4. Logical Data Structures

The tag 20 can arrange the data and information it acquires and the determinations it generates in one or more logical data structures wherein related data, information, and determinations are logically grouped for storage and access in the memory element of the processor/memory 34 and/or the NVM 42. One potential logical data structure 90 is illustrated in FIG. 6. However, it will be appreciated that numerous other and different data arrangements and structures could also be used. Any and all such data arrangements and structures that are consistent with carrying out the goals, functions, and operations of the tag 20 described herein are intended to be included within the scope of the descriptions of example embodiments herein.

The logical data structure 90 can include a permanent storage section 92 for storage of data to be retained permanently or semi-permanently. Storage section 92 can physically reside in the NVM 42. Data and information regarding the tag 20 and the livestock 12 to which it is attached that is intended to be retained permanently or semi-permanently can be stored together in the permanent storage section 92. For example, such data and information can include, but is not limited to, data and other information that uniquely identifies the tag 20, such as a unique tag ID, unique encryption key(s) for secure communications with the tag 20, and contact information for the owner of the tag 20 in case it becomes detached and is lost and found. Such data and information can also include, but is not limited to, data and information unique to the livestock 12 to which the tag 20 is attached, such as a unique asset number 12. Other unchanging information regarding the livestock 12, e.g., sex, breed, etc. can also be stored in section 92. Still further, if the tag 20 and the data processor 120 are configured for the data processor 120 to communicate the birth date of the livestock 12 to the tag 20, whether from a tag attached to the mother or as determined by the data processor 120, those determinations can also be included in the permanent storage section 92.

The logical data structure 90 also can include a tag data section 94 comprising records of data and determinations that the tag 20 periodically acquires or receives or generates in operation as described herein. Such data can include, but is not limited to, the date and time of each data or determination record, tag orientation data, tag elevation data, tag motion data, tag position data, biometric sensor data, environmental sensor data, and local sensor data, all as described herein. The tag orientation data and the tag motion data can include some or all of the orientation and motion-related data generated by the IMU 36, for example. The tag position data can include some or all of the absolute and/or relative position related data generated by the IMU 36, the LDS 100, and/or the GNSS receiver 64, if included. The biometric data can include some or all of the biometric data, e.g., internal temperature, heart rate, blood oxygenation, etc. generated by the sensors 30 and the environment data can include some or all of the environmental condition data, e.g., temperature, humidity, etc. generated by the sensors 38, 40, 52, 54, and others, if included. The local sensor data can include some or all of the data acquired from local sensors 47, e.g., weight, time eating/drinking, etc. The activity/behaviors can include any or all of the determinations made by the tag 20 from the data, including but not limited to stationary, resting, ambulating, walking, running, eating/drinking, ruminating, jumping, standing to be mounted, mounting, etc. If the tag 20 is configured to autonomously generate the ultimate determinations of birth date and age, those determinations can also be included. The tag data section 94 can physically reside in volatile memory in the processor/memory 34 of the tag 20, however if the tag 20 is configured to autonomously generate the ultimate determinations of birth date and age, it may be desirable to retain those determinations in the permanent data section 92 in the NVM 42.

Each time the tag 20 acquires or receives all or some such data, e.g., every 30 seconds, a record comprising the set of data acquired or received can be stored in the tag data section 94 together with the date and time the set of data was acquired or received. If desired, the tag 20 can be configured to apply data filtering techniques to the acquired data and store the filtered data to minimize errors and reduce the volume of data stored in the tag 20. The data records in the tag data section 94 can be over-written individually, in blocks, or entirely by subsequently acquired or received newer data records. As one example, after a set period of time has elapsed or a set amount of storage capacity has been used each subsequently acquired or received new data record can individually over-write the oldest stored data record still retained in the tag's memory. The tag data section 94 can thus operate like a circular buffer operating on a first in-first out basis. As another example, after some or all of the data records in the tag data section 94 have been communicated to the data processor 120, some or all of the communicated records can be erased individually or as a block and can be subsequently overwritten.

G. Location Detection System (LDS)

Example embodiments of a livestock age verification system 10 may include a location detection system (LDS) 100, preferably comprising a radio location detection system. The LDS 100 is adapted and configured to communicate radio frequency (RF) signals with the tag 20 and to generate position-related data for the tag 20, and hence the livestock 12 to which it is attached. The LDS 100 is preferably configured to generate position-related data that includes, but is not limited to, relative and absolute position, change in position, distance, rate of change, direction or heading, etc.

The LDS 100 preferably comprises one or more radio frequency (RF) antennas 102 with associated RF transceivers and is configured to transmit and receive RF signals with the tag 20 via the RF antennas 102 and associated RF transceivers. The LDS 100 is preferably configured to use one or more radio location detection techniques and calculations that are familiar to persons skilled in the art to determine the position-related data for the tag 20, and hence the livestock 12 to which it is attached. For example, the LDS 100 can be configured to apply one or more radiolocation techniques and calculations to the RF signals 11 including, but not limited to, time of arrival (TOA), time difference of arrival (TDOA), angle of arrival (AOA), received signal strength (RSSI) power difference, and others.

Figure 7A:
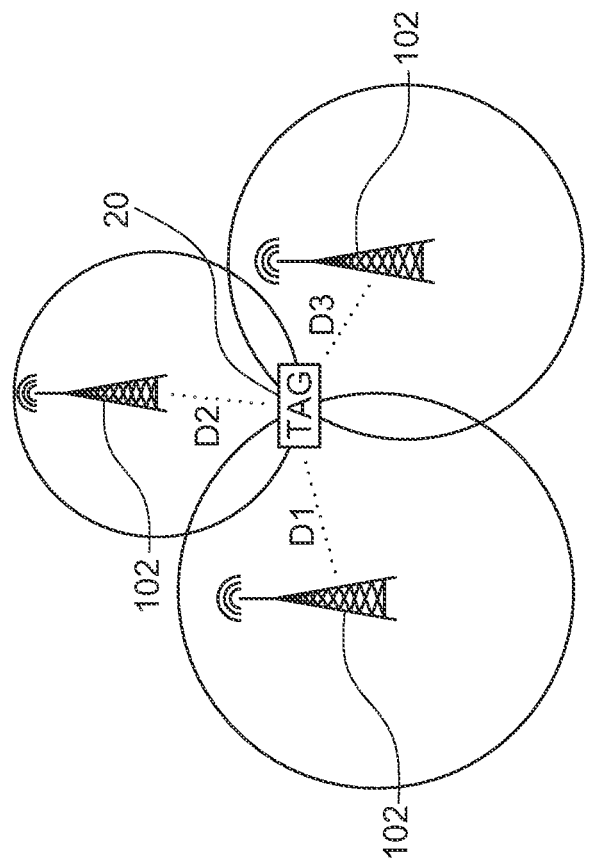
FIG. 7A is a graphical diagram illustrating a first antenna arrangement of a radio location detection system of a livestock age verification system in accordance with an example embodiment.

In one example embodiment shown in FIG. 7A, the LDS 100 may comprise two RF antennas 102 at known spaced apart locations. The LDS 100 can be configured to transmit and receive RF signals with the tag 20 at each RF antenna 102. The LDS 100 can be configured to determine the relative position and direction of the tag 20 from the RF signals received from the tag 20 at each of the RF antennas 102 using one or more of the above-mentioned radiolocation techniques, or others, and employing radiolocation triangulation techniques and calculations also familiar to persons skilled in the art. With the absolute locations of the RF antennas 102 being known in terms of latitude and longitude coordinates, the LDS 100 can determine the absolute location of the tag 20 using calculations that are familiar to persons skilled in the art.

Figure 7B:
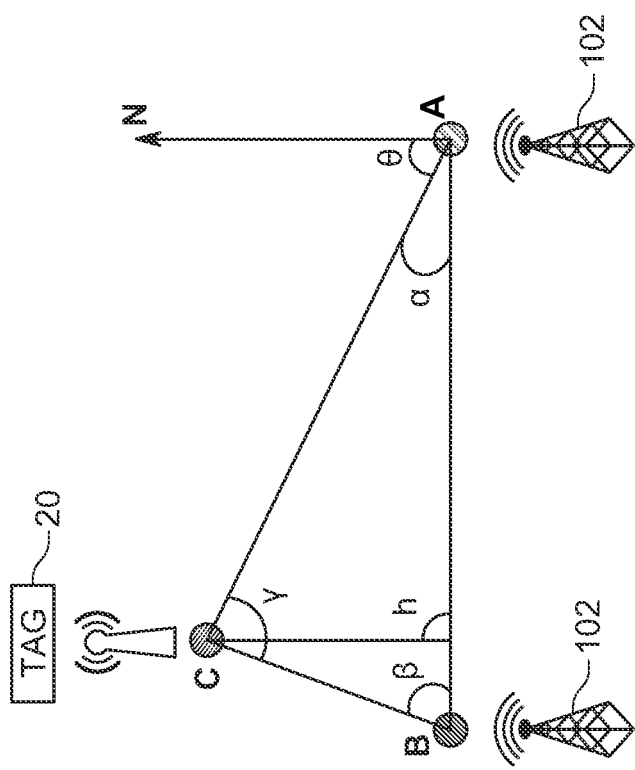
FIG. 7B is a graphical diagram illustrating a second antenna arrangement of a radio location detection system of a livestock age verification system in accordance with an example embodiment.

In another example embodiment shown in FIG. 7B, the LDS 100 can comprise three RF antennas 102 at known spaced apart locations. The LDS 100 can be configured to transmit and receive RF signals with the tag 20 at each RF antenna 102. The LDS 100 can be configured to determine the relative position and direction of the tag 20 from the RF signals received from the tag 20 at each of the RF antennas 102 using one or more of the above-mentioned radiolocation techniques and calculations, or others, and employing radiolocation intersection techniques and calculations that are also familiar to persons skilled in the art. With the absolute locations of the RF antennas 102 being known in terms of latitude and longitude coordinates, the LDS 100 can also be configured to determine the absolute location of the tag 20 using calculations that are familiar to persons skilled in the art.

The LDS 100 can be configured to communicate RF signals with the tag 20 periodically at a fixed or variable interval of time. By determining the location of the tag 20 from the RF signals received at each time interval, LDS 100 can also readily calculate the change in position over each interval, including the distance between determined positions and the direction or heading between positions. Because the time interval between positions is known, the LDS 100 can also readily calculate the rate of change or movement between the two positions via a simple distance over time calculation.

The LDS 100 can also be configured to communicate RF signals with the tag 20 on an on-demand basis. That is, the LDS 100 can be configured to transmit an RF signal to the tag 20 at any time it is desired to determine the position and other related data of the tag 20 and the livestock 12 to which it is attached. The tag 20 can be configured to respond each time it receives an RF signal from the LDS 100 with an RF signal, and the LDS 100 can determine the position of the tag 20 at each time as described herein. Because the times at which the tag 20 communicates the RF signal are known, the LDS 100 can readily determine not only the position of the tag 20 at each time, but also change in position, distance, rate of change or movement, direction or heading, etc. as described above.

In some example embodiments, the LDS 100 can be configured to determine from the position-related data the activities and behaviors of the livestock 12 in the same manner as previously described herein with respect to the tag 20. For example, the LDS 100 can be configured to determine whether, when, and for how long the livestock 12 is stationary, resting, ambulating, e.g., walking or running, and eating/drinking, including grazing, among other physical characteristics. The LDS 100 can also be configured to cumulate the time the livestock 12 spent engaged in each determined activity/behavior over a period of time in the same manner as described above with respect to the tag 20.

In some example embodiments, the LDS 100 can be further configured to generate a prediction or determination of birth date and age and/or a vigor metric or score for the livestock 12 from the determined activities and behaviors, also in the same manner as described previously with respect to the tag 20. In some example embodiments, the LDS 100 can be configured to communicate some or all of the position related data acquired and/or predictions or determinations made therefrom to the data processor 120. In other example embodiments, the LDS 100 can be configured to just acquire the position-related 11 data described herein and communicate it to the data processor 120, without processing the data or making any predictions or determinations. In embodiments in which the LDS 100 processes the location-related data and makes determinations and predictions regarding the birth date and age of the livestock 12, the LDS 100 can also be configured to communicate such determinations to the tag 20 for storage therein. The LDS 100 can include a communications interface with one or more communications channels similar to those described for the tag 20 to communicate data and/or determinations with the data processor 120 and/or the tag 20.

Figure 7C:
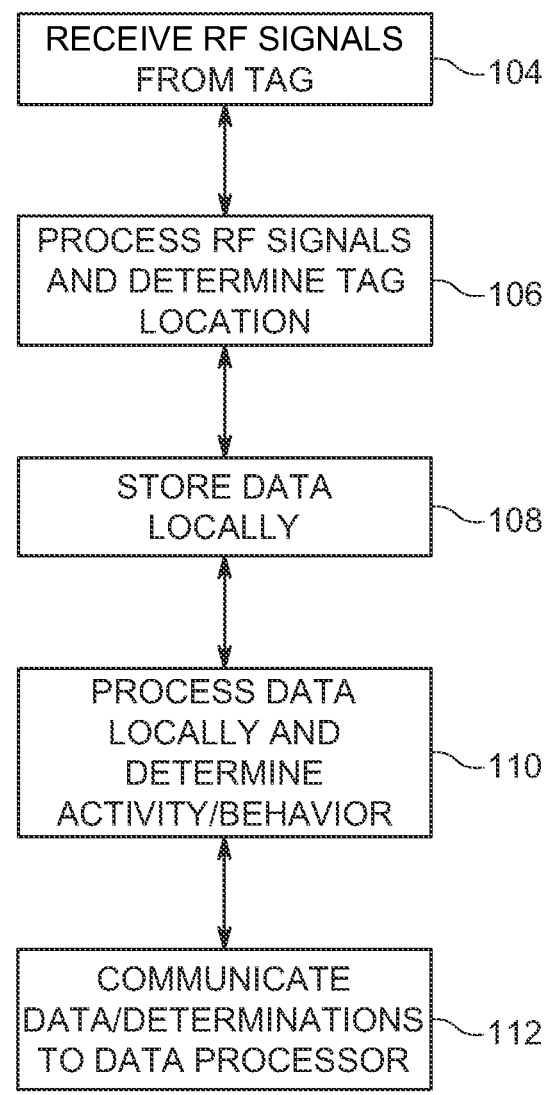
FIG. 7C is a functional block diagram of a radio location detection system of a livestock age verification system in accordance with an example embodiment.

The LDS 100 can perform the functions described herein according to a logical flow. One example of a general logical flow is shown in FIG. 7C. In block 104, LDS 100 receives RF signals from the tag 20 on the RF antennas 102 and associated RF transceivers. In block 106, the LDS 100 processes the received and determines the location of the tag 20. As described above, the LDS 100 can be configured to process the received RF signals using radiolocation techniques and calculations familiar to persons skilled in the art. As also described above, the LDS 100 can also be configured to determine from the determined location and previous location determinations other location-related data such as distance, heading, and rate of change, for example. In block 108, the LDS can store the location-related data locally. In block 110, the LDS 100 can process the location-related data as described here and make determinations of livestock 12 activity and behaviors, for example resting, walking, running, etc. Such determinations can also be stored locally. In block 112, the LDS 100 can communicate the location-related data and any determinations made to the data processor 120 and tag 20, if desired. The LDS 100 can be configured to follow the logical flow with steps being carried out sequentially or in parallel. Certain steps can be carried out in a forward and backward direction. The flow can be carried out in a continuous loop or at discrete intervals of time. Persons skilled in the art will appreciate that all of these variations and others are possible. Accordingly, all such variations that are consistent with the purposes and functions of the LDS 100 as described herein are intended to be included within the scope of the embodiments disclosed herein.

H. Data Processor

Example embodiments of a livestock age verification system 10 include a data processor 120. The data processor 120 is adapted and configured to receive the data generated by the tag 20 and/or the LDS 100. In some example embodiments, the data processor 120 can also receive data directly from one or more local sensors 47. As described herein, such data can include but is not limited to orientation, motion-related data, position-related data, environmental condition data, biometric data, weight data, etc. In some example embodiments, the data processor 120 may also be adapted and configured to receive corresponding determinations of activity and behavior generated by the tag 20 and/or the LDS 100. As described herein, such determinations can include, but are not limited to, stationary, resting, ambulating, e.g., walking or running, eating/drinking, grazing, etc. In yet other example embodiments, the data processor 120 can be adapted and configured to receive predictions or determinations of birth date and age and/or a vigor metric generated by the tag 20 and/or the LDS 100, as described herein.

In addition to being adapted and configured to receive data and/or determinations from the tag 20 and/or the LDS 100, the data processor 120 can also be adapted and configured to send data and information to the tag 20 and/or the LDS 100. Such data and information can include, but is not limited to, data intended to be permanently stored in the tag 20, e.g., a tag ID, encryption keys, asset number, etc. as shown in FIG. 6 and described herein. Such data and information can also include the birthdate and age of the livestock 12 as predicted or determined by the data processor 20, and/or other unchanging data characterizing the livestock 12, such as the breed and sex. Such data and information can further include updates for programs, applications, AI models, and other detection algorithms, etc. in the tag 20 and/or LDS 100.

The data processor 120 is adapted and configured to aggregate the data and/or determinations received from the tag 20 and/or the LDS 100 with the same types of data and/or determinations from a plurality of other tags attached to a plurality of other livestock and to store the aggregated data for analysis. The data processor 120 is adapted and configured to process and analyze the aggregated data and/or determinations and to generate therefrom a prediction or determination of the birth date and age, a vigor metric or score, and a relative vigor metric of the livestock 12 as described in further detail herein.

The data processor 120 can comprise and can be hosted on one or more computers, such as a desktop PC, workstation, or server at one or more fixed locations, including in the cloud, and/or on one or more other electronic devices 74, including mobile computing devices, such as a laptop PC or tablet computer, etc. A number of suitable host platforms are identified and described herein. In addition, all or a portion of the data processor 120 can be duplicated and/or distributed across one or more host platform devices. The data processor 120 is adapted and configured to communicate with the tags 20 and the LDS 100 wirelessly either locally or remotely via cellular, satellite, or IP-based networks, LPWAN, and/or other communications channels as illustrated in FIGS. 4 and 8.

I. Elements and Architecture

Figure 8:
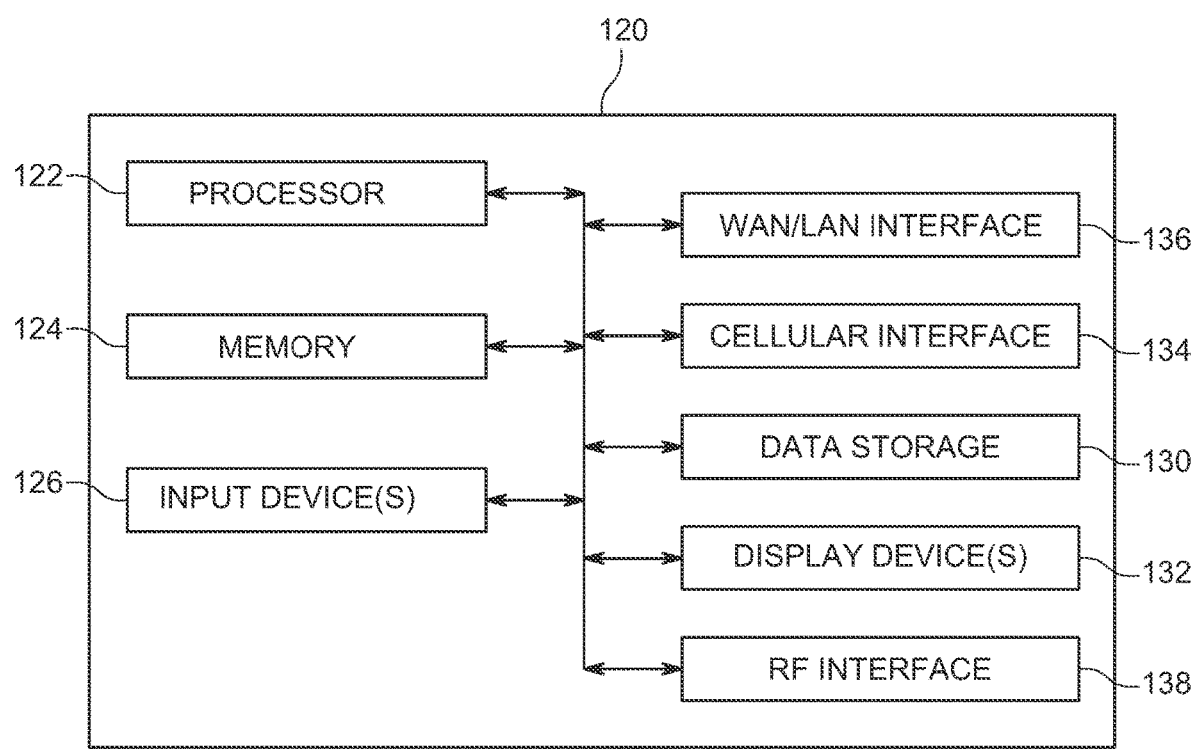
FIG. 8 is a block diagram illustrating the elements and architecture of a data processor of a livestock age verification system in accordance with an example embodiment.

As illustrated in FIG. 8, the data processor 120 can include a processor 122, a volatile memory 124, one or more input devices 126, mass data storage 130, and one or more display devices 132. The data processor 120 can also include a communications interface for communicating with the tag 20 attached to the livestock 12, other tags attached to other livestock, and the LDS 100. Depending on how it is desired to communicate with the tag 20 and LDS 100, the communications interface can comprise one or more of a cellular network interface 134, a WAN/LAN network interface 136, and a local RF interface 138. If desired, the communications interface could also include a satellite network interface and/or an LPWAN interface.

The processor 122 can comprise any processor suitable for performing the functions of the data processor 120 as described herein. The processor 122 is configured and programmed to communicate with, to control, and to manage the various other components and elements of the data processor 120 via a bus 128. Further identification and details of suitable processors are described elsewhere herein and in the published applications incorporated herein by reference. As such they need not be repeated here.

The memory 124 provides temporary storage for operating system and applications programs, models, etc. and associated data to be executed and used by the processor 122 in performing the functions of the data processor 120 described herein. Further identification and details of suitable memory 124 are described elsewhere herein and in the published applications incorporated herein by reference. As such they need not be repeated here.

The input device(s) 126 are adapted and configured to enable a user to interact with the data processor 120. The data processor 120 is preferably adapted and configured to allow the user to use one or more of the input device(s) 126 to interact with the functions and operations of the data processor 120 including, but not limited to, inputting and/or adjusting parameters of programs or models for comparing and/or otherwise analyzing the tag 20 data in relation to the aggregated data, selecting particular items or categories of aggregated data or information to be analyzed and/or presented by the data processor 120, selecting available programs, applications, models, algorithms, functions, etc. to be executed, making requests or giving commands to the data processor 120, etc. Further identification and details of suitable input devices 126 are described elsewhere herein and in the published applications incorporated herein by reference. As such they need not be repeated here.

The data storage 130 provides mass storage for the data and determinations received from the tag 20 and/or the LDS 100 and in some example embodiments local sensors 47. The data storage 130 also provides mass storage for the aggregation of the same types of data and determinations received from a plurality of other tags attached to a plurality of other livestock and from local sensors 47 for a plurality of other livestock. The data storage 130 may comprise any mass storage device or devices that can provide a sufficient volume of storage to hold the aggregated data determinations and that can make them available on demand for processing and analysis by the data processor 120. Further identification and details of suitable data storage 130 are described elsewhere herein and in the published applications incorporated herein by reference. As such they need not be repeated here.

The display device(s) 132 comprise one or more devices that are adapted and configured to visually present a user interface, data, etc. for a user of the data processor 120. The user interface can include, but is not limited to, menus for selecting programs, applications, models, functions, operations, analyses, etc. to be performed; accessing data and/or determinations of selected tags; selecting, filtering, organizing, and displaying other selected data from the aggregated data, etc. Further identification and descriptions of suitable display devices 132 are described elsewhere herein and in the published applications incorporated herein by reference. As such they need not be repeated here.

The communications interface of the data processor 120 and the communications channels it comprises can be similar to the COMMS interface 44 and communications channels of the tag 20 as described herein. The cellular network interface 134, WAN/LAN network interface 136, satellite communications interface, and the RF interface 138 provide the data processor 120 with one or more different types of communications channels that can be used to communicate with the tag 20 attached to the livestock 12, other tags attached to other livestock, and the LDS 100. Further description and details of the cellular network interface 134, WAN/LAN network interface 136, satellite communications interface, and the RF interface 138 are described herein in connection with the tag 20 and elsewhere, as well as in the published applications incorporated herein by reference. As such they need not be repeated here.

2. Functions, Data, and Operational Flow

As illustrated graphically in FIGS. 9A-9E, the data processor 120 is preferably adapted and configured to perform a number of functions and operations that ultimately include generating a prediction or determination of the birth date and age of the livestock 12 to which the tag 20 is attached as well as a vigor metric and relative vigor metric for the livestock 12. The data processor 120 generally follows a logical flow in carrying out those functions and operations. It will be appreciated that the graphical representation in FIGS. 9A-9E are merely examples of some of the functions and operations the data processor 120 can be adapted and configured to carry out and provide merely an example of one possible logical flow for carrying out such functions and operations. In addition, it should be appreciated that the logical flow illustrated in FIGS. 9A-9E is intended to be logical in nature and is not intended to be interpreted as necessarily requiring a linear and sequential flow of all of the functions, operations, steps and/or activities performed by the data processor 120. Rather, multiple functions, operations, steps and/or activities illustrated may be carried out in various orders and simultaneously or sequentially.

Figure 9A:
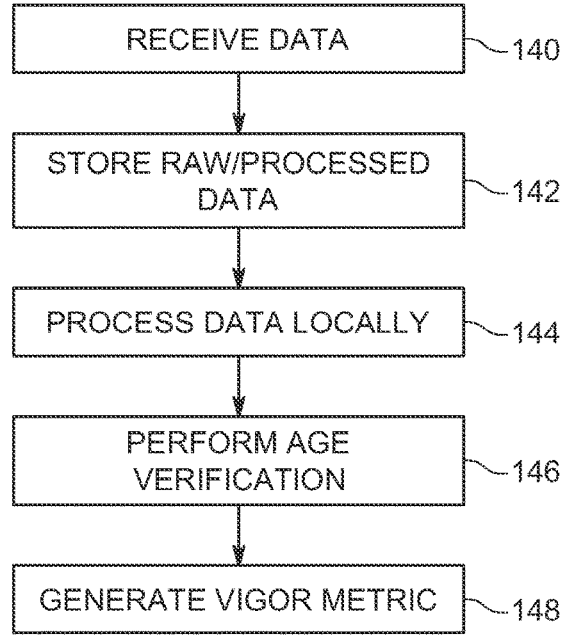
FIG. 9A is a functional block diagram of a data processor of a livestock age verification system in accordance with an example embodiment.

Referring to FIG. 9A, in block 140 the data processor 120 receives data generated by the tag 20 attached to the livestock 12 and/or data by the LDS 100 as described herein. In some example embodiments, the data processor 120 also receives data for the livestock 12 directly from one or more local sensors 47. The data processor 120 also receives the same types of data generated by a plurality of other tags attached to a plurality of other livestock and from local sensors 47 for a plurality of other livestock 12. As described herein, the data can comprise various data related to physical parameters of the livestock 12, including but not limited to, orientation, motion-related data, position-related data, and/or biometric data. The data can also comprise environmental condition data and weight data. In some example embodiments, the data processor 120 can also receive determinations of physical parameters of the livestock 12, e.g., physical activities and behaviors, generated locally by the tag 20 and/or the LDS 100. The data processor 120 can also receive the same types of data and determinations for a plurality of other livestock generated by a plurality of other tags and local sensors 47 for a plurality of other livestock. As described herein, the determinations of activities and behaviors can include, but are not limited to, stationary, resting, ambulating, e.g., walking or running, eating/drinking, grazing, etc. In some example embodiments, the data processor 120 can also receive the ultimate predictions or determinations of birth date and age, and/or vigor metrics or scores generated by the tag 20 and/or the LDS 100, and by the plurality of other tags. The various data and determinations can be received from the tag 20 and from the plurality of other tags on a periodic basis without intervention by the data processor 120 or in response to the data processor 120 sending a request or demand for the data and determinations.

In block 142, the data processor 120 stores the received data and determinations in the data storage 130. The function of storing the data and determinations is described further with reference to FIG. 9B and includes aggregating and categorizing data and determinations. The stored data and determinations comprises a time-series data set of the various activities, behaviors, and other physical parameters of the individual livestock 12 and the plurality of other livestock over time under various environmental conditions.

In block 144, the data processor 120 processes the stored data from the tag 20 attached to the livestock 12 and from the local sensors 47 to determine physical parameters of the livestock 12 over time, e.g., activities and behaviors, from which the birth date and age, as well as vigor and relative vigor metrics can be determined. The data processor 120 similarly processes the stored data for the plurality of other tags attached to the plurality of other livestock. The function of processing the data is described further with reference to FIG. 9C.

In block 146, the data processor 120 analyzes the stored processed data and determinations from the tag 20 attached to the livestock 12 and/or the LDS 100 and the local sensors 47 in relation to the aggregation of data and determinations of the same types from the plurality of other tags attached to the plurality of other livestock and/or the LDS 100 and the local sensors 47 to perform age verification, i.e., to determine or predict the birth date and age of the livestock 12. In some example embodiments, the analysis comprises a statistical analysis of the data and determinations for the livestock 12 in relation to the aggregation of data and determinations of the same types of data and determinations for the plurality of other livestock. The function of performing age verification is described further with reference to FIG. 9D.

In block 148, the data processor 120 analyzes the stored processed data and determinations from the tag 20 attached to the livestock 12 and/or the LDS 100 and the local sensors 47 in relation to the aggregation of data and determinations of the same types from the plurality of other tags attached to the plurality of other livestock and/or the LDS 100 to generate a vigor metric and relative vigor metric for the livestock 12. In some example embodiments, the analysis comprises a statistical analysis of the data and determinations for the livestock 12 in relation to the aggregation of data and determinations of the same types of data and determinations for the plurality of other livestock. The analysis may also comprise a statistical analysis of the determined vigor metric or score for the livestock 12 in relation to the plurality of vigor metrics or scores determined for the plurality of other livestock to generate a relative vigor metric. The function of generating vigor and relative vigor metrics is described further with reference to FIG. 9E.

Figure 9B:
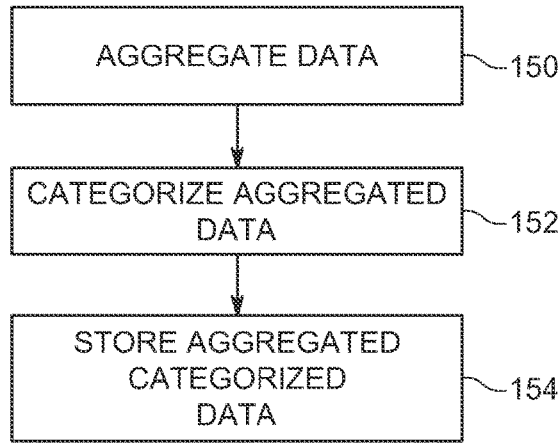
FIG. 9B is a functional block diagram illustrating a store data function of a data processor of a livestock age verification system in accordance with an example embodiment.

Referring to FIG. 9B, in block 150 the data processor 120 aggregates the data and determinations received from the tag 20 attached to the livestock 12 and/or the LDS 100 and the local sensors 47 with the data and determinations of the same types from the plurality of other tags attached to the plurality of other livestock, and/or the LDS 100, and the local sensors 47, over time. Aggregation of the data and determinations can, but need not comprise an independent step from storing the data and determinations in the data storage 130. Rather aggregation can be accomplished simply by receiving the data and determinations over time and storing them in the data storage 130 together as they are received.

Referring to FIG. 10A, the data processor 120 can be configured and adapted to arrange the aggregated data, information, and determinations stored in the data storage 130 in one or more logical data structures in which logically related data, information, and determinations are grouped together. While FIG. 10A illustrates one example logical data structure 174, it will be appreciated that numerous variations of the example logical data structure 174 could be used and all such variations that are consistent with carrying out the goals, functions, and operations of the data processor 120 as described herein are intended to be included within the scope of the example embodiments described herein.

The logical data structure 174 can include a data/determinations section 176 which can contain a plurality of records of data, information, and determinations stored by the data processor 120 periodically over time. Each set of data, information, and/or determinations received or stored at a given time and associated with a particular tag and livestock can be thought of as a logical record. Each logical record can include any or all of the data, information, and/or determinations a tag 20 and/or LDS 100 and local sensors 47 can generate and communicate to the data processor 140 as described herein. Each logical record can include a plurality of fields and each filed can include a plurality of related items of data.

Each logical record can include a field labeled "tag ID" for example. The "tag ID" field can contain a unique tag number or other indicia and a unique asset number or other indicia that uniquely associate the data, determinations, and other information contained in the record with a particular tag 20 and livestock 12.

Each logical record can also include a field labeled "date/time" that contains the date and time the data, information and/or determinations contained in the record were generated or received by the tag 20 or the LDS 100.

Each logical record can also include a field labeled "tag data." The "tag data" field can include all of the data for a tag 20 and the livestock 12 to which it is attached from the tag 20 at a single date and time. As described herein, such data can include, but is not limited to, livestock linear and angular orientation, heading, linear and angular motion and acceleration, elevation, biometric data, and environmental condition data. Alternatively, the "tag data" field can be divided into separate fields or sub-fields for each of the individual data items or related groups of individual data items.

Each logical record can also include a field labeled "tag location." The "tag location" field can include all of the position-related data for a tag 20 and the livestock 12 to which it is attached that is generated by the LDS 100 as described herein. As described herein, such data can include, but is not limited to, relative and absolute position, change in position, direction or heading, rate of change, etc. It will be appreciated that if desired, the "tag data" and "tag location" fields can be combined in a single field. It will also be appreciated that in some example embodiments, logical records may include data items in either the "tag data" field or the "tag location" field if the livestock age verification system 10 is arranged such that only one of the IMU 36 of the tag 20 and the LDS 100 is actively generating data.

Each logical record can also include a field labeled "other sensor data. The "other sensor data" field can include data from a local sensor/transceiver 47, such as a sensor attached to a scale or feed station, and can comprise one or more items of data, e.g., measured weight, etc.

Each logical record can also include a field labeled "determined activity," which can include determinations of activity or behavior physical parameters by the tag 20 and/or the LDS 100. As described herein, such determinations can include, but are not limited to, the livestock 12 being stationary, resting, ambulating, walking or running, eating/drinking, grazing, ruminating, resting, etc. In some example embodiments in which the tag 20 and/or the LDS 100 are configured and adapted to only communicate their data to the data processor 120 for processing and not to make determinations from the data, the "determined activity" field either may not be present, or the data processor 120 may populate the field with its own determinations from the tag and/or LDS data.

The logical data structure 174 can also include a section 178 that includes a plurality of records containing permanent or unchanging data or characteristics for each livestock 12. Each record can include a plurality of fields. For example, each record can include a field for the tag ID and associated asset number of the livestock 12 with which the unchanging data or characteristics are associated, fields for the breed and sex of the livestock, etc. In some example embodiments, each record can include a field for the birth date of the livestock. This field can contain the birth date as provided by a trusted outside source, by a tag attached to the mother of the livestock 12, or as predicted or determined by data processor 120, or a combination of those. Once the birth date of a livestock 12 has been obtained from a tag attached to the mother, determined or predicted by the data processor 120, or obtained from a trusted outside source, maintaining a record of it at the data processor 120 can facilitate providing age verification since the data processor 120 need only retrieve the birth date for a livestock 12 from the stored record, rather than re-analyzing the data and re-determining it each time. In an example embodiment in which the tag 20, the LDS 100, or both, also predict or determine the birth date of the livestock 12, the data processor 120 can be configured to determine which prediction or determination to use if they are not the same. For example, the data processor 120 can preempt the other determinations with its own determination. Alternatively, the data processor 120 can adjust its own determined birth date based on the other determinations, for example by averaging.

In block 152, the data processor 120 can be configured to categorize the aggregated data and determinations received from the tag 20 attached to the livestock 12, the local sensors 47, the plurality of other data and determinations of the same types from the plurality of other tags attached to the plurality of other livestock, and/or the LDS 100. Categorizing the aggregated data and determinations for a plurality of livestock according to shared characteristics of the livestock facilitates statistical and other analysis of the data and determinations from a tag 20 attached to an individual livestock 12 or LDS 100 in relation to the aggregated data and determinations from a plurality of tags attached to a plurality of other livestock in order to generate a meaningful relative vigor metric for the livestock 12. For example, it is appreciated by persons skilled in the art that a vigor metric or score for a livestock 12 by itself has little meaning. However, when compared or otherwise analyzed to one or a plurality of vigor metrics or scores for one or a plurality of other livestock having similar characteristics, determined in the same manner and using the same types of data, a relative vigor metric that is meaningful can be determined.

One example of a suitable scheme for categorizing the aggregated data for a plurality of tags and livestock is illustrated in FIGS. 10B and 10C. As shown, the aggregated data includes a plurality of logical data records each including a tag ID, date/time, and tag data or LDS data as described above. In this example, the aggregated data is categorized into a number of high level and lower level categories and sub-categories corresponding to a number of characteristics shared by the livestock. At a first highest level, the aggregated data is categorized according to the data source, i.e., the aggregated data is categorized according to data generated by tags 20 in FIG. 10B and data generated by LDS 100 in FIG. 10C. This is because the data generated by each source is somewhat different and the determinations of activity, behavior, and ultimately vigor from the generated data may thus vary somewhat. The aggregated data is categorized at a second lower level or sub-level according to the breed of the livestock, at a third lower level sub-level by sex, and at a fourth lower level or sub-level by age. It will be appreciated that other shared characteristics can also be used to further categorize and/or sub-categorize the aggregated data as desired to generate a suitably tailored and meaningful relative vigor metric for each livestock.

It will also be appreciated that although the example schemes of FIGS. 10B and 10C show the categorized aggregated data records as being arranged in a particular order, that arrangement is merely to facilitate describing the categorization. It will be appreciated that other means can also be used. For example, the aggregated data records can be in any order and be categorized by linking records with one or more shared characteristics.

In block 154, the data processor 120 can be configured to store the aggregated and categorized data and determinations, preferably in the data storage 130.

Figure 9C:
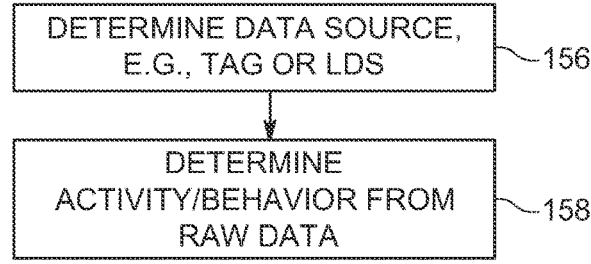
FIG. 9C is a functional block diagram illustrating a process data function of a data processor of a livestock age verification system in accordance with an example embodiment.

Referring to FIG. 9C, in block 156 the data processor 120 can be configured in some example embodiments to determine the source of one or more data records. In some example embodiments, either the tag 20 (and other tags) or the LDS 100 will be adapted and configured to generate and communicate their data to the data processor 120. In other example embodiments both the tag 20 (and other tags) and the LDS 100 will be adapted and configured to do so. Since the data generated by the tag 20 (and other tags) and the LDS 100 is somewhat different and is processed somewhat differently to make determinations, as described herein, the data processor 120 may need to determine the source of the data to be processed. However, it will be appreciated that in example embodiments in which only the tag 20 (and other tags) or the LDS 100 communicate data to the data processor, the source of the data can be presumed and need not be determined.

In block 158, the data processor 120 is configured and adapted to process the data received from the tag 20 and/or the LDS 100 and the local sensors 47 and to determine therefrom certain physical parameters of the livestock 12 that can be analyzed to determine the birth data and age of the livestock 12, as well as the vigor of the livestock 12. The physical parameters can include, but are not limited to, various activities and behaviors by the livestock 12, and biometric data of the livestock 12, both as described herein. The processor 120 can be configured to determine the physical parameters, i.e., activities/behaviors and biometric data, in the same manner as described herein with respect to the tag 20. The data processor 120 can be configured to process the same types of data received from all of the plurality of tags attached to the plurality of other livestock, the same types of data received from the local sensors 47, and/or the same types of data received from the LDS 100 for the plurality of other livestock, in the same manner to determine the same types of physical parameters for each of the plurality of other livestock. The data processor 120 can be configured to store the determinations of the physical parameters for the livestock 12 and for each of the plurality of other livestock in the corresponding data records described above.

Figure 9D:
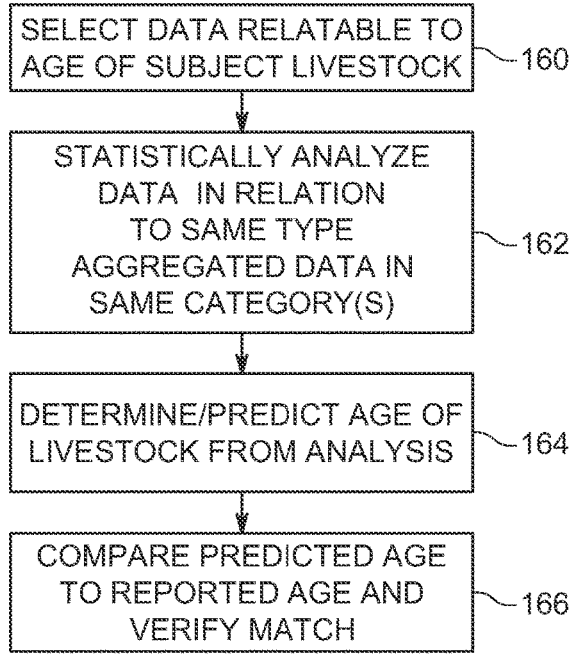
FIG. 9D is a functional block diagram illustrating an age verification function of a data processor of a livestock age verification system in accordance with an example embodiment.

Referring to FIG. 9D, further details of the function to perform age verification for a livestock 12 are illustrated. In block 160, the data processor 120 is configured to select the data and determinations that are relatable to and are indicative of the birth date and age of the livestock 12. For example, as described herein, the data processor 120 can be configured to select the determinations of activity/behavior as described herein for the livestock 12 over time. The data processor 120 can be configured to also select certain biometric data of the livestock 12 over the same time. The data processor 120 can select the determinations and data from the data records of the livestock 12 described above.

In block 162, the data processor 120 is configured to analyze the selected determinations and data. If the data processor 120 has selected both activity/behavior determinations and biometric data for the livestock over the same time period, the analysis can include correlating the activities/behaviors with the biometric data over time. For example, activity/behavior of the livestock 12, e.g., resting, walking, running, etc. can be correlated in time with heart rate, blood oxygenation, and/or internal temperature of the livestock 12. In some example embodiments, the activity/behavior and correlated biometric data of the livestock 12 can be analyzed alone to detect a pattern that is indicative of the birth date and age of the livestock 12. In other example embodiments, the analysis can comprise a statistical analysis of the pattern of activity/behavior, correlated biometric data, if any, and/or predicted birth date of the livestock 12 in relation to the same types of data, patterns, and/or predicted birth dates determined for the plurality of other livestock. For example, from the aggregation of data for the plurality of other livestock 12, the same types of data, e.g., activity/behavior and biometric data, can be analyzed, the same patterns indicative of birth date determined, and birth dates predicted for the plurality of other livestock. The pattern and predicted birth dates can be statistically analyzed to determine how well the pattern predicts accurate birth dates and how great the variation (standard deviation) in predicted birth dates is for the data set. Further, the pattern and/or the predicted birth date for the livestock 12 can be statistically analyzed in relation to the patterns and predicted birth dates for the plurality of other livestock to determine the accuracy of the pattern in predicting the birth date of the livestock 12 and the variation of the predicted birth date of the livestock 12 in relation to an expected predicted birthdate from the statistical analysis of the aggregated data for the plurality of other livestock 12.

Figure 12A:
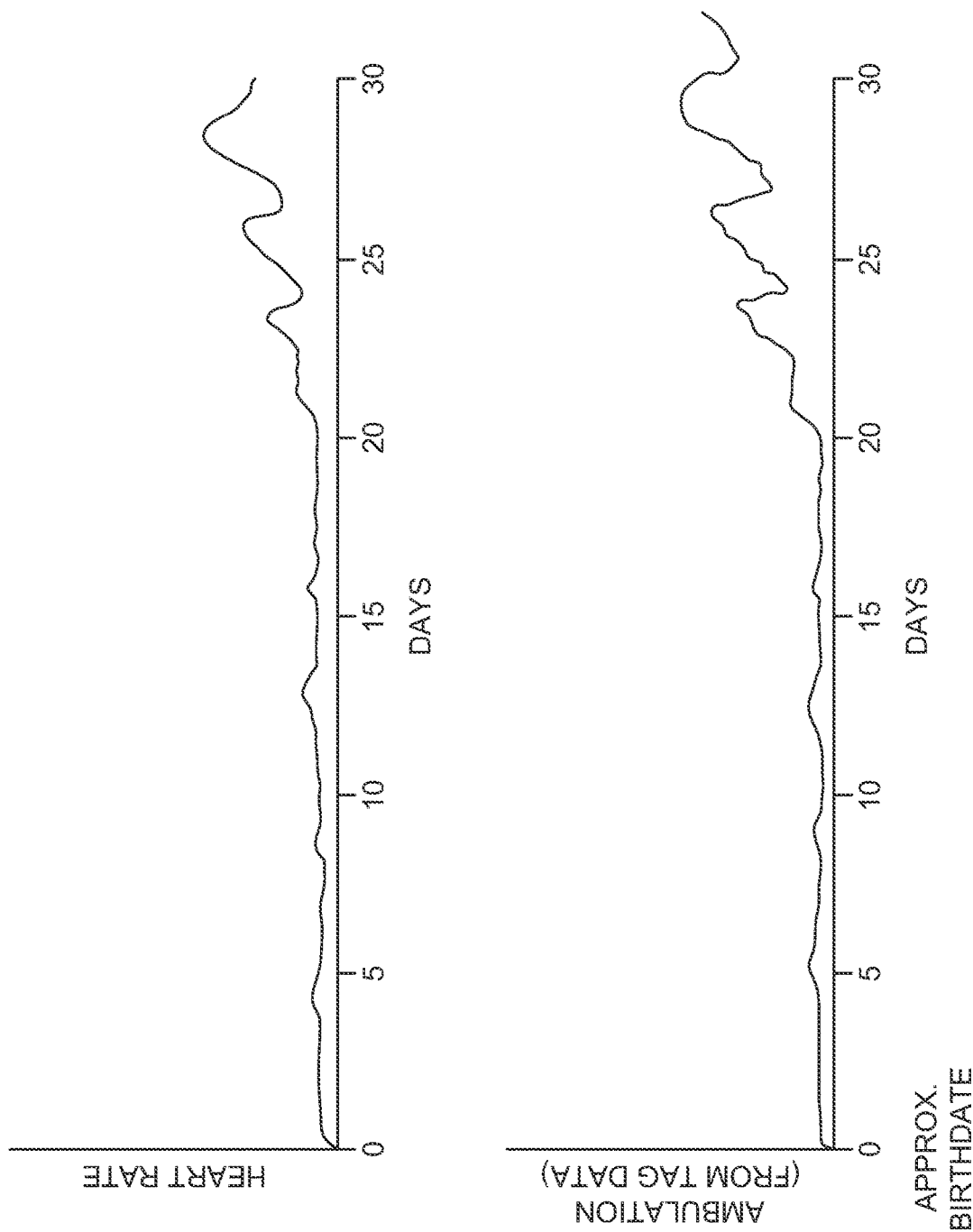
FIG. 12A are graphs illustrating ambulation and heart rate over time as detected by a tag and a biometric sensor of a livestock verification system for determining the birth date and verifying the age of a livestock in accordance with an example embodiment.
Figure 12B:
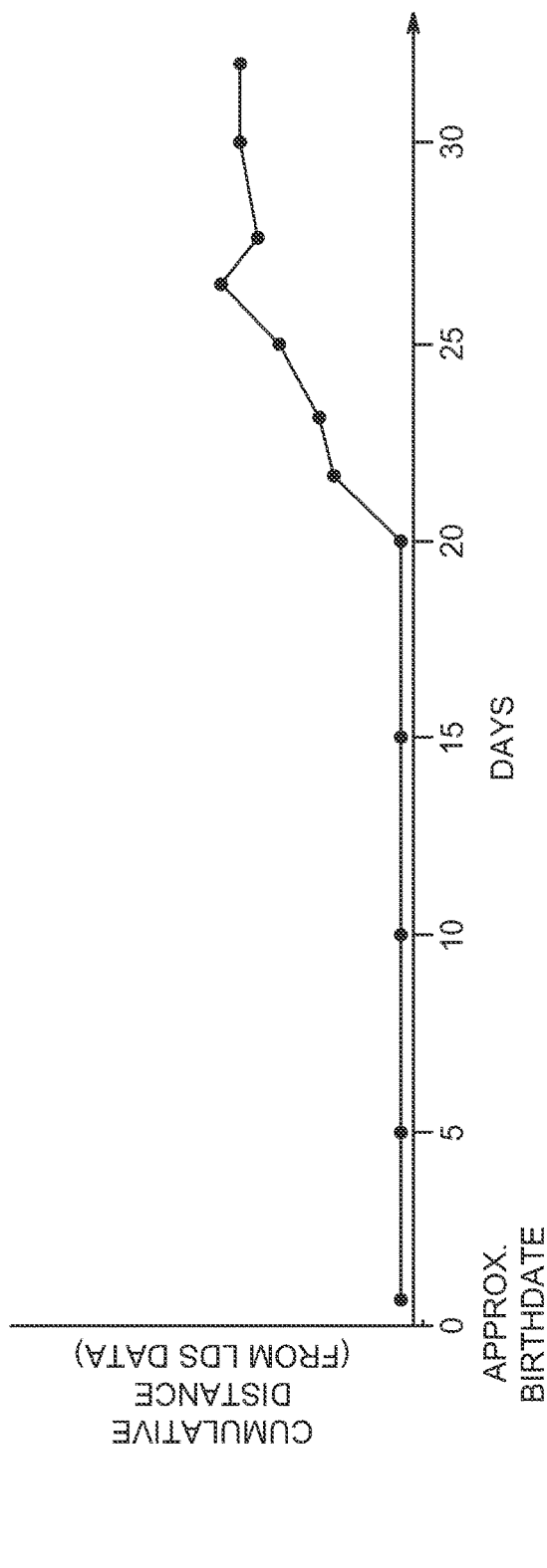
FIG. 12B is a graph illustrating cumulative distance moved by a livestock as a function of time as detected by a location detection system of a livestock verification system for determining the birth date and verifying the age of a livestock in accordance with an example embodiment.

In block 164, the data processor 120 is configured to determine or predict the birth date and age of the livestock 12 from the analysis. As described above, in some example embodiments, the data processor 120 can be configured to determine or predict the birth date and age from analysis of the data and determinations for the livestock 12 alone. For example, as described herein above, a newborn bovine calf typically remains relatively stationary and at rest for approximately three weeks and then exhibits a surge in movement and activity. Thus, as illustrated in FIGS. 12A and 12B, the data processor 12 can be configured to determine or predict the birth date of the livestock 12 from this pattern of motion and heart rate correlated in time over a time period, e.g., 30 days. As shown, for a period of approximately 21 days of the 30 day period, the motion-related data produced by the tag 20 (IMU 36) and by the LDS 100 indicates little or no ambulation and little or no distance traveled by the livestock 12. The correlated heart rate data indicates a relatively low and steady heart rate. At about day 21 and through day 30 of the period, the motion-related data indicates a surge of motion/activity and distance traveled, and the correlated heart rate data indicates an increase in heart rate that corresponds with the increased motion/activity and distance traveled by the livestock 12. From this pattern, the data processor 120 can predict the approximate birth date of the livestock 12 at day 0 of the period and can predict the current age of the livestock by the time elapsed since then.

As described above, in other example embodiments, the data processor 120 can be configured to determine the birth date and age of the livestock 12 and/or to determine the accuracy of the predicted birth date and age statistically. For example, the predicted birth date and/or the accuracy thereof can be determined using standard deviation and standard error calculations familiar to persons skilled in the art from the birth date and age as predicted from the livestock 12 data alone and the mean predicted birth date and age for the plurality of other livestock from the same pattern of activity/behavior.

In block 166, the data processor 120 can verify the age of the livestock 12 by comparing the age derived from the predicted birth date to a stated age, for example an age stated to a breeding association or buyer. In some example embodiments, the data processor 120 can verify the age of the livestock 12 by comparing the age derived from the stored birth date detected by a tag attached to the mother of the livestock 12 to a stated age. The stated age can be deemed verified if the derived age exactly or relatively closely matches the stated 6 age. As described herein, the data processor 120 can store the predicted age, once determined, in the appropriate data record for the livestock 12 as described herein to avoid having to re-perform the predicted birth date analysis each time age verification is desired.

Figure 9E:
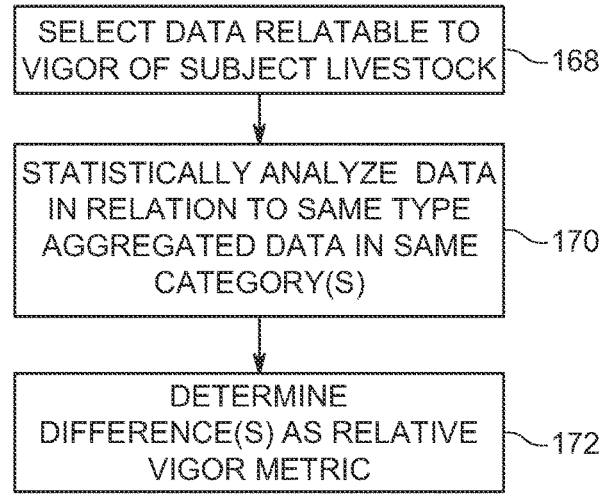
FIG. 9E is a functional block diagram illustrating a vigor metric function of a data processor of a livestock age verification system in accordance with an example embodiment.

Referring to FIG. 9E, further details of the function to generate a relative vigor metric for the livestock 12 are illustrated. In block 168, the data processor 120 is configured to select data and determinations that are relatable to and are indicative of the vigor of the livestock 12. For example, as described herein, the data processor 120 can be configured to select the determinations of activity/behavior as described herein for the livestock 12 over time. The data processor 120 can also be configured to select certain biometric data of the livestock 12 over the same time if desired. The data processor 120 can select the determinations and data from the data records of the livestock 12 described above.

In block 170, the data processor 120 is configured to analyze the selected data and determinations over a selected period of time. If the data processor 120 has selected both activity/behavior determinations and biometric data for the livestock 12, the analysis can include correlating the activities/behaviors with the selected biometric data over time. Similarly, if the data processor 120 has selected environmental condition data, that data can also be correlated in time with the activities/behaviors determinations. For example, activity/behavior of the livestock 12, e.g., resting, walking, running, etc. can be correlated in time with heart rate, blood oxygenation, and/or internal temperature of the livestock 12 and/or with temperature and humidity over a selected time period, e.g., 30 days.

Figure 12C:
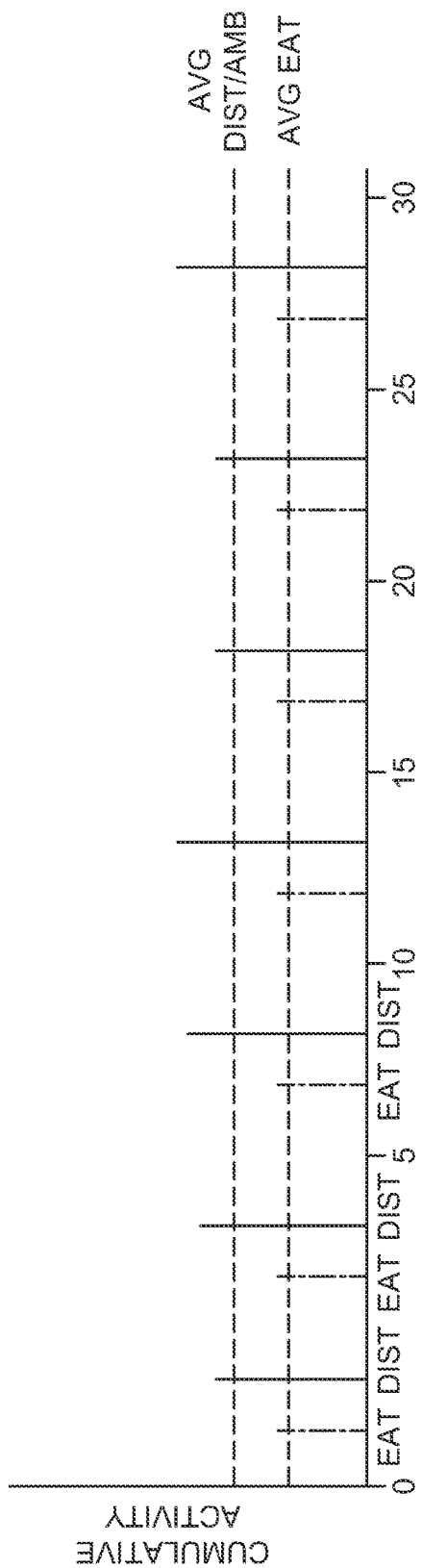
FIG. 12C is a graph illustrating cumulative time eating/drinking and cumulative distance moved by a livestock as a function of time as detected by a tag and/or location detection system of a livestock verification system for determining a vigor metric of the livestock in accordance with an example embodiment.

The analysis may include calculating or otherwise determining a vigor metric or score for the livestock 12 from the data related to the livestock 12 according to an arbitrary formula. As one example, the analysis can include cumulating the time the livestock 12 spent engaged in each activity/behavior over time and/or if the activity involves motion, the distance the livestock 12 traveled over the same time period as indicators of vigor. Referring to FIG. 12C for example, the data processor 120 can determine the amount of time the livestock 12 spent eating and the distance it traveled at various times over a time period, e.g., 30 days. The data processor 120 can determine a vigor metric or score for the livestock 12 from this data based on an arbitrary formula. For example, the formula could determine the vigor metric by assigning relative weights to the eating time and distance traveled parameters based on their importance as vigor indicators, determining the average time spent eating and the average distance traveled during the time period, and summing the weighted average values. The formula could also assign weights to correlated biometric and environmental data if included in the analysis or adjust the eating and distance data based on the values of such data. Alternatively, the formula could determine the vigor metric by summing the average or total amount by which the livestock 12 exceeded a long term average of time spent eating and a long term average of distance traveled by other livestock over the same period of time obtained from an outside source. The analysis may also include statistically analyzing the determined vigor metric or score for the livestock 12 in relation to the same vigor metrics or scores aggregated for a plurality of other livestock in the same physical categories, e.g., breed, sex, and age, determined using the same data and determinations and the same arbitrary formula. In some example embodiments, the analysis may include the "calving ease score" as a parameter of the arbitrary formula.

In block 172, the data processor 120 is configured to determine the difference between the vigor metric or score determined for the livestock 12 and the vigor metric or score for another livestock. The difference indicates a relative vigor metric for the livestock 12 compared to the other livestock. Alternatively, or in addition, the data processor 120 can be configured to compare the vigor metric or score determined for the livestock 12 to a statistical mean or median of an aggregation of vigor metrics or scores determined for a plurality of other livestock 12 in the same physical categories as the livestock 12, e.g., breed, sex, and age. The difference indicates a relative vigor metric for the livestock 12 compared to a large sample of like livestock.

It will be appreciated that by continuing to receive, aggregate, and store the data and determinations described herein, and others, for a large number of livestock over a long period of time, the livestock age verification system 10 can a mass a large and rich data set that, in conjunction with the same types of data for a particular livestock 12, will enable increasingly accurate predictions of birth date and age of the livestock 12, as well as increasingly meaningful determinations of relative vigor metrics. It will also be appreciated that the data processor 120 can comprise one or more AI models to generate predicted birth date and age and relatively vigor metrics for a livestock 12 and that a large and rich data set can be used to train and update such models from time to time to achieve even more accurate results.

I. Operation of Example Embodiment

In an example use of the livestock age verification system 10, a tag 20 as described herein is attached to the ear 14 of a livestock 12. One or more sensors 30 are also attached to or implanted in the livestock 12. Preferably the tag 20 and sensors 30 are attached to the livestock 12 at or shortly after its birth as described herein. It is assumed that any data or information intended to remain in the tag 20 permanently as described herein is stored in the tag 20 prior to or at the time it is attached to the livestock 12. A plurality of other tags are similarly attached to a plurality of other livestock. The tag 20, the other tags, the LDS 100, and the data processor 120 are configured to operate in the manner described herein and to perform the functions described herein.

Thereafter, the tag 20, the plurality of other tags, the LDS 100, and the data processor 120 operate largely automatically and autonomously to carry out the various functions and operations described herein with respect to each of them and to communicate with each other as described herein. As the tag 20, the other tags, and the LDS 100 generate and communicate additional data, information, and determinations to the data processor 120 over time, the data processor 120 aggregates, categorizes and stores the data and determinations as described herein. From the aggregated data and determinations, the data processor's algorithms and models for predicting or determining the birth date, age, and vigor metrics of livestock are trained and updated in order to increase the accuracy of the determinations.

When needed or desired, a user of the livestock age verification system 10 requests the system via an input device 126 to verify a stated age of a particular livestock 12, for example an age stated to a breeding association or buyer. The system 10 determines or predicts a birth date and age of the livestock 12 as described herein from the data and determinations generated over time by the tag 20 attached to the livestock 12 and from an aggregation of the same types of data generated over time by a plurality of other tags attached to a plurality of other livestock. The system 10 verifies the stated age if the age of the livestock 12 derived from the predicted birth date exactly or relatively closely matches the stated age.

Similarly, when needed or desired, a user of the livestock age verification system 10 requests the system via an input device 126 to generate a relative vigor metric for a particular livestock 12. The system 10 determines and reports the relative vigor metric of the livestock compared to one or more other livestock as described herein from the data and determinations generated over time by the tag 20 attached to the livestock 12 and from an aggregation of the same types of data generated over time by a plurality of other tags attached to a plurality of other livestock.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified 6 in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the present disclosure will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the embodiments in the present disclosure, suitable methods and materials are described above. Thus, the present disclosure is not intended to be limited to the embodiments shown, but is to be accorded the widest scope consistent with the principles and features disclosed herein.

What is claimed is:

1. A system for monitoring a livestock, comprising:
a tag attachable to the livestock, wherein the tag comprises a sensor that is adapted to sense a physical parameter of the livestock and wirelessly communicate a first data indicative of the physical parameter; and
a data processor adapted to receive the first data, wherein the data processor comprises a data storage for storing a first aggregation of data of the same type as the first data for a plurality of other livestock, wherein the data processor is configured to perform an analysis of the first data in relation to the first aggregation of data, and generate an indication of the age of the livestock from the analysis.

2. The system for monitoring a livestock of claim 1, wherein the livestock is a bovine calf.

3. The system for monitoring a livestock of claim 1, wherein the sensor comprises an inertial measurement unit (IMU) and the physical parameter comprises movement and/or a type of movement.

4. The system monitoring a livestock of claim 1, wherein the sensor comprises a biometric sensor and the physical parameter comprises one of heart rate, blood oxygenation, and internal temperature.

5. The system for monitoring a livestock of claim 1, wherein the data processor is configured to generate an indication of the relative vigor of the livestock from the analysis.

6. The system for monitoring a livestock of claim 1, wherein the first aggregation of data is categorized according to at least one physical characteristic of the livestock.

7. The system for monitoring a livestock of claim 6, wherein the physical characteristic is at least one of breed, sex, and age.

8. A system for monitoring a livestock, comprising:
a tag attachable to the livestock,
a data processor, and
a location detection system configured to wirelessly communicate with the tag to produce a location data of the livestock, generate from the location data a first data indicative of movement and/or a type of movement of the livestock, and wirelessly communicate the first data to the data processor,
wherein the data processor comprises a data storage for storing a first aggregation of data of the same type as the first data for a plurality of other livestock, and wherein the data processor is configured to receive the first data, perform an analysis of the first data in relation to the first aggregation of data, and generate an indication of the age of the livestock from the analysis.

9. The system for monitoring a livestock of claim 8, wherein the livestock is a bovine calf.

10. The system for monitoring a livestock of claim 8, wherein the data processor is configured to generate an indication of a relative vigor of the livestock from the analysis.

11. The system for monitoring a livestock of claim 8, wherein the first aggregation of data is categorized according to at least one physical characteristic of the livestock.

12. The system for monitoring a livestock of claim 11, wherein the physical characteristic is at least one of breed, sex, and age.

13. The system for monitoring a livestock of claim 8, wherein the location detection system comprises a radio location detection system.

14. A system for monitoring a livestock, comprising:
a tag attachable to the livestock, wherein the tag comprises a sensor that is adapted to sense a physical parameter of the livestock and wirelessly communicate a first data indicative of the physical parameter,
a location detection system configured to wirelessly communicate with the tag to produce a location data of the livestock, generate from the location data a second data indicative of the physical parameter of the livestock, and wirelessly communicate the second data indicative of the physical parameter, and
a data processor adapted to receive the first data and the second data, wherein the data processor comprises a data storage for storing a first aggregation of data of the same type as the first data for a plurality of other livestock and a second aggregation of data of the same type as the second data for a plurality of the other livestock, and wherein the data processor is configured to perform an analysis of the first data in relation to the first aggregation of data, an analysis of the second data in relation to the second aggregation of data, and to generate an indication of the age of the livestock from the analyses.

15. The system for monitoring a livestock of claim 14, wherein the sensor comprises an inertial measurement unit (IMU) and the physical parameter comprises movement and/or a type of movement.

16. The system monitoring a livestock of claim 14, wherein the sensor comprises a biometric sensor and the physical parameter comprises one of heart rate, blood oxygenation, and internal temperature.

17. The system for monitoring a livestock of claim 14, wherein the data processor is configured to generate an indication of a relative vigor of the livestock from the analysis.

18. The system for monitoring a livestock of claim 14, wherein the first aggregation of data and the second aggregation of data are categorized according to at least one physical characteristic the livestock.

19. The system for monitoring a livestock of claim 18, wherein the physical characteristic is at least one of breed, sex, and age.

20. The system for monitoring a livestock of claim 14, wherein the location detection system comprises a radio location detection system.

* * * * *